United States Patent [19]
Takahashi et al.

[11] Patent Number: 5,274,559
[45] Date of Patent: Dec. 28, 1993

[54] METHOD FOR PREDICTING A FUTURE VALUE OF MEASUREMENT DATA AND FOR CONTROLLING ENGINE FUEL INJECTION BASED THEREON

[75] Inventors: Shinsuke Takahashi, Yokohama; Teruji Sekozawa, Kawasaki; Makoto Shioya, Tokyo; Motohisa Funabashi, Sagamihara, all of Japan

[73] Assignee: Hitachi, Ltd., Tokyo, Japan

[21] Appl. No.: 421,783

[22] Filed: Oct. 16, 1989

[30] Foreign Application Priority Data

Oct. 19, 1988 [JP] Japan .................. 63-261494
Dec. 7, 1988 [JP] Japan .................. 63-307816

[51] Int. Cl.$^5$ .................. G06F 15/20; F02D 41/04; F02D 41/30
[52] U.S. Cl. .................. 364/431.05; 364/431.07; 123/480
[58] Field of Search .............. 364/723, 431.05, 431.06, 364/431.07, 148, 158; 123/480, 422, 423, 492, 493; 73/117.3

[56] References Cited

U.S. PATENT DOCUMENTS

| | | | |
|---|---|---|---|
| 3,619,360 | 11/1971 | Persik, Jr. ............... | 364/150 |
| 3,631,520 | 12/1971 | Atal ...................... | 375/27 |
| 4,424,568 | 1/1984 | Nishimura et al. ......... | 364/431.05 |
| 4,548,185 | 10/1985 | Pozniak .................. | 364/431.06 |
| 4,604,703 | 8/1986 | Hasegawa ................. | 364/431.05 |
| 4,852,538 | 8/1989 | Nagaishi ................. | 123/480 |
| 4,881,509 | 11/1989 | Ohashi et al. ............ | 123/480 |
| 4,933,863 | 6/1990 | Okano et al. ............. | 364/431.06 |
| 4,957,088 | 9/1990 | Hosaka ................... | 123/480 |
| 4,959,789 | 9/1990 | Nakamura ................. | 364/431.05 |
| 4,974,563 | 12/1990 | Ikeda et al. ............. | 123/480 |
| 5,003,950 | 4/1991 | Kato et al. .............. | 123/423 |

*Primary Examiner*—Vincent N. Trans
*Attorney, Agent, or Firm*—Antonelli, Terry, Stout & Kraus

[57] ABSTRACT

A future value is predicted based on time-serial data of measurement data heretofore available to attain high precision control of fuel injection of an engine, by providing: (1) an unit for determining an acceleration/deceleration level representing a magnitude of acceleration/deceleration of a vehicle based on a displacement of a throttle opening degree in a predetermined time, (2) an unit for predicting the future value by a digital advancing filter based on measurement data heretofore available, and (3) a correction unit for calculating a measurement amount which is under or over when the predicting process is conducted, in accordance with the acceleration/deceleration level, and adding the calculated measurement value to said predicted value to calculate the future value of the measurement data. Where a table for converting outputs of various sensors arranged around the engine etc. to physical amounts such as suction air amount, an unit for increasing the search speed for the table is provided.

34 Claims, 21 Drawing Sheets

SEARCH POSITION

START POSITION FOR SEARCH

METHOD FOR PREDICTING A FUTURE VALUE OF MEASUREMENT DATA AND FOR CONTROLLING ENGINE FUEL INJECTION BASED THEREON

BACKGROUND OF THE INVENTION

The present invention relates to a method for controlling an automobile engine, and more particularly to a method for controlling fuel injection of the automobile engine.

Further, the present invention relates to method and apparatus for control by using a digital computer or logic circuit, and more particularly to a method for looking up a table suitable for speeding up an operation.

In a prior art electric control apparatus for an engine, a fuel amount to be supplied in a next step is determined based on a detected amount of suction air in a current step to control fuel.

In the prior art technique, there exists an air amount detection error of approximately one step. Therefore, it is difficult to keep the fuel supply amount to a proper value and hence it is difficult to highly precisely control an air-to-fuel ratio. Further, since the air amount detection error is compensated by allopathic treatment, number of step of development increases.

A prior art method which theoretically solves the above problem is disclosed in JP-A-63-253137. However, it is hard to implement it with an existing 8-bit microcomputer because of the large calculation load required.

On the other hand, a prior art method for looking up a table is explained for a control apparatus of an automobile engine.

As an example of the table look-up, a table look-up for correcting an output voltage characteristic of a sensor is explained.

FIG. 8 shows an output voltage characteristic of a hot wire sensor for measuring suction air amount. A signal produced by the hot wire sensor is an analog signal as shown in FIG. 9 and it represents a voltage value. It is A/D-converted to a digital signal. Since the digital signal also represents a voltage, it is necessary to convert it to a physical amount which represents an air amount sucked per unit time. The air amount is calculated by using an air amount conversion table.

In the air amount conversion table, an abscissa represents a voltage and there are several grid points which represent air amounts. Where on the voltage axis (abscissa in FIG. 10) of the air amount conversion table the A/D converted voltage (KHW) of the signal provided by the hot wire sensor is located is determined. This is called searching. Namely, where in the table $THW_i$ the KWH belongs to is determined, where $\{THW_i | 0 \leq i \leq n_H - 1\}$. For example, j which meets a condition of $$THW_j \leq KHW < THW_{j+1} \qquad (1)$$

is determined. (Alternatively, j which meets a condition of $$THW_{j-1} \leq KHW < THW_j \qquad (2)$$

may be determined. The $THW_i$ shown above are sorted in an ascending order but intervals between $THW_i$ and $THW_{i+1}$ ($0 \leq i \leq n-1$) are not equal.

Based on the result of above search, the air amount for the voltage KHW is determined by the following linear interpolation.

$$VQ = VQ(THW_j) + \frac{VQ(THW_{j+1}) - VQ(THW_j)}{THW_{j+1} - THW_j} \times (KHW - THW_j) \qquad (3)$$

where VQ(.) represents an air amount for the voltage on the table.

As shown in FIG. 11, a gradient between $THW_{j+1}$ and $THW_j$ is determined, and $KHW-THW_j$ is multipled thereby to determine a physical amount VQ(KHW) for the voltage KHW.

Such a table which converts the characteristic of the sensor is used not only by the hot wire sensor but also various other sensors such as wide band air-to-fuel ratio sensor, coolant (cooling water) temperature sensor and throttle opening degree sensor. Most of them have non-linear conversion characteristics of the physical amount to the sensor output voltage. Such a sensor having the non-linear characteristic uses the above table look-up.

Particularly, in automobile control, a table look-up is frequently carried out based on data produced by various sensors, in the process of calculating various operation amounts such as fuel injection pulse width and ignition timing.

As an example, an operation to determine a fundamental ignition timing by linear interpolation on a two-dimension table based on an engine rotating speed N and a load LD=Qa/N (air amount/engine rotating speed) is briefly explained.

FIG. 12 shows an example of an ignition timing table. A position on the rotating speed axis the rotating speed N is located is searched and $j_1$ which meets a condition of $$TN_{j1} \leq N < TN_{j1+1} \qquad (4)$$

determined, where $\{TN_i | 0 \leq i \leq n_1 - 1\}$ is the rotating speed at a grid point having the value of ignition timing on the rotating speed axis. On the other hand, a position on the load axis where the load LD is located is searched and $j_2$ which meets a condition of $$TLD_{j2} \leq LD < TLD_{j2+1} \qquad (5)$$

is determined, where $\{TLD_i | 0 \leq i \leq n_{2-1}\}$ is the rotating speed of the grid point having the ignition timing on the rotating speed axis. After the search, a point G is determined by a 4-point interpolation calculation as shown in FIG. 13. The point G may be determined in the following manner.

$$(i) \quad F = B + \frac{A - B}{LD_{j2+1} - LD_{j2}} \times (LD - LD_{j2}) \qquad (6)$$

$$(ii) \quad E = C + \frac{D - C}{LD_{j2+1} - LD_{j2}} \times (LD - LD_{j2}) \qquad (7)$$

$$(iii) \quad G = F + \frac{E - F}{TN_{j1+1} - TN_{j1}} \times (N - TN_{j1}) \qquad (8)$$

where
$A = AD(TN_{j1}, LD_{j2+1})$,
$B = AD(TN_{j1}, LD_{j2})$,
$C = AD(TN_{j1+1}, LD_{j2})$,
$D = AD(TN_{j1+1}, LD_{j2+1})$, and AD $(\alpha,\beta)$ is a fundamental ignition timing at a grid point $(\alpha,\beta)$ on the table.

In this manner, during the operation for controlling the engine, it frequently occurs that the values which contribute to the operation amount are looked up from the table based on the measured data and modified data (for example, load) derived from the measured data. While the two-dimension table is used above, it also frequently occurs that the value is looked up from a one-dimension table by the interpolation calculation.

The prior art search operation is explained for the search of the engine rotating speed N. The grid points of the rotating speed axis are sorted in an ascending order in the following manner. This is called an ordered table for the rotating speed $$TN_i < TN_{i+1} | 0 \leq i \leq n-1 \qquad (9)$$

As shown in FIG. 14, the values $TN_i$ of the ordered table for the rotating speed are sequentially compared with the rotating speed N in the ascending order to find j which meets the condition of the formula (4). For example, when the engine rotating speed is high, the number of times of comparison with the rotating speed ordered table increases, and the operation time increases. The search procedure is programmed as a subroutine, and the search for the rotating speed as well as a search on other ordered tables are conducted. In an operation condition where the engine rotating speed is high, various data such as suction air amount, throttle opening degree, load and water temperature are in relatively high dynamic ranges. Accordingly, all of those tables are looked up, and the comparison is started from the start point (smallest value) of the ordered table for each operation cycle to determine where the data is. Since various data are searched from various ordered tables and the search is started from the same start point for each operation cycle, the operation time required for the search is very large. When the operation time is too large, a set of operations (called a task) of lower priority may not be executed and normal control may not be attained. Particularly, when the rotating speed is high, the rotation time within a constant crank angle is shortened. As a result, the operations to be processed in the crank angle period increase in a constant time, and the above problem dominantly rises.

SUMMARY OF THE INVENTION

It is an object of the present invention to provide a method for predicting a future value of measurement data, based on time-serial data of measurement values heretofore available.

It is a second object of the present invention to provide a method for controlling fuel injection of an engine which solves the above problems.

It is a third object of the present invention to provide a method for speeding up a table look-up operation including searching for a table which contains operation data of an automobile, such as operation data of an engine.

In order to achieve the first object of the present invention, there is provided an electronic control apparatus of an automobile engine which comprises:

(1) means for determining acceleration/deceleration level representing a magnitude of acceleration or deceleration of a vehicle based on a displacement of a throttle opening degree in a predetermined time, (2) means for predicting and outputting a future value of measurement data using a digital advancing filter based on measurement data heretofore available, and (3) correction means for calculating a measurement amount which is under or over if the prediction is made by the prediction means, in accordance with the acceleration/deceleration level, and adding the calculated measurement amount to the output of the prediction means to calculate the future value of the measurement data.

In order to achieve the second object of the present invention, the means is applied to the prediction of the future value of the detection value of the engine operation status, such as suction air amount, and the fuel is controlled in accordance with the predicted value.

The prediction means predicts the future value by use of an advancing filter based on the measurement data heretofore available. Where the measurement value changes smoothly, high precision prediction is attained.

The correction means calculates the measurement amount which is under or over if the prediction is made by the advancing filter, when the measurement data starts to change relatively fast from a steady state, and calculates the future value of the measurement data. Thus, the precision of a the prediction at an early stage of transient period is assured.

When this prediction method is applied to the prediction of the suction air amount of the engine, the suction air amount in one step advance can be predicted with high precision, and high precision control of the air-to-fuel ratio is attained by controlling the fuel supply amount in accordance with the predicted value.

The third object of the present invention is achieved by one of the following means:

(1) Means for holding result of past search and reflecting it to the current search.

(2) Means for holding result of interpolation calculation (particularly, result of gradiation calculation) in past table look-up and reflecting it to the current interpolation calculation.

(3) Means for calculating and holding gradients between grid points in the table look-up and looking up the table while saving a portion (division) of the interpolation calculation.

(4) Means for effecting the search in a descending order (The comparison is made starting from larger values to smaller values of the ordered table).

(5) Means for reflecting a search result relating to one data to a search procedure relating to other data.

(6) Means for reflecting a combination of search results of several data to search procedure of particular data.

The foregoing means may be implemented by logic circuits. If the intervals of the values of the ordered table are equal, the table look-up may be done by a microprogram of a microcomputer.

The first means relates to the search procedure of data which vary from time to time. For example, the result of search for one data one cycle before is held up to the current time, and when data of same kind is to be searched at the current time, the search is started based on the result of search (that is, where in the ordered table data was located). Since the data in a steady operation is typically found at substantially the same search position or in the vicinity thereof, the search time is shortened and the operation speed is increased.

In the transient operation mode, the search is started in accordance with the trend of change of data. Accordingly, a location which is predicted to be searched at a current stage is determined based on the history of the location searched in the past, and the search is started from that location. In this manner, the search time is also shortened in the transient operation mode.

The second means holds the result of a past operation and utilizes it in the current linear interpolation calculation. For example, the gradient calculation (division) in the formulas (3), (6) and (7) may be omitted. As a result, the interpolation operation speed is increased.

The third means calculates and holds the gradients in the interpolation calculation, reads out the gradient at the searched position for the operation.

The fourth means compares starting from larger value to smaller value of the ordered table, that is, in the descending order to determine the search position in the high rotating speed mode which causes a large computation load, instead of comparing starting from smaller value to larger values of the ordered table to determine the search position, as is done in the prior art. As a result, in the search operation, the higher the rotating speed is, the lower is the calculation load. Thus, the overall calculation load is unified.

The fifth and sixth means limit the search range of data on the ordered table based on other data or a combination of several data such as correlation between the measurement data, for example between the throttle opening degree and the suction air amount in the engine control, or infers the search position and reflects it to the search procedure (for example, determine the start position of the search).

The searching is done by a search circuit which comprises a comparator and a counter constructed by logic circuits, and the search data is sequentially compared with the values on the ordered table. For example, the counting-up is continued until the search data becomes smaller than the value on the ordered table. In this manner, the prior art procedure shown in FIG. 14 can be attained by hardware.

Where the intervals of the values on the ordered table are equal, the bit column of the search data is divided into an indirect address field of the ordered table and an interpolation ratio field, the indirect address field is deemed as a search result, a difference between values on the opposite sides of the search data is calculated by using the bit column of the indirect address field multiplied by the interpolation ratio. Those operations are carried out under control of a microprogram.

DESCRIPTION OF THE PREFERRED EMBODIMENTS

One embodiment of the present invention is now explained with reference to FIGS. 1 to 6.

Figure 1:
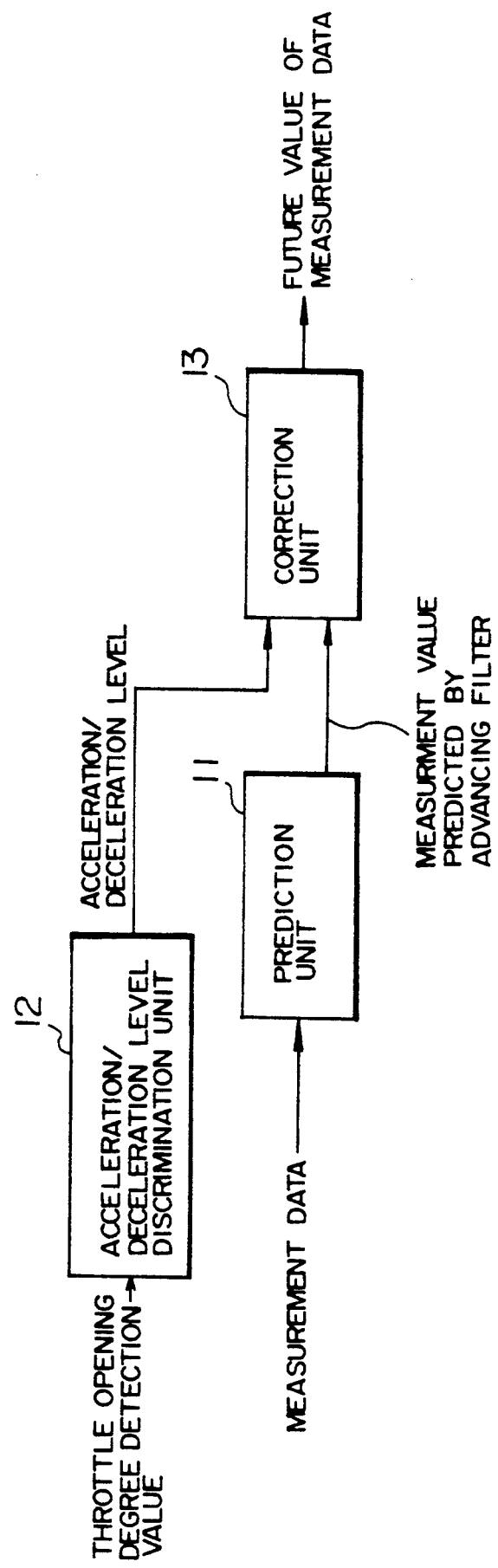
FIG. 1 shows a configuration of future value prediction device for measurement data in accordance with the present invention.

FIG. 1 shows a configuration of a device for predicting a future value of measurement data. It comprises an acceleration/deceleration level discrimination unit 12, prediction unit 11 and correction unit 13. Operations of the respective units are explained below.

The prediction unit 11 predicts a future value using a digital advancing filter based on measurement data heretofore available.

A prediction method using the advancing filter is preferably simple from a standpoint of processing by a microcomputer. Examples thereof are:

(i) Predict a future value based on a measurement value heretofore available on the assumption that an increment of measurement data per unit time (one-order differentiation of the measurement data by time) is held for a predetermined time period.

(ii) Predict a future value based on a measurement value heretofore available on the assumption that an increment of the above increment per unit time (two-order differentation of the measurement data by time) is held for a predetermined time period.

The prediction formulas in (i) and (ii) are expressed as follows.

$$\hat{S}(k) = S(k) + \frac{T}{j \cdot \Delta t} \{S(k) - S(k-j)\} \quad (10)$$

$$(j = 1, 2, 3 \ldots)$$

$$\hat{S}(k) = 3 \cdot S(k) 3 \cdot S(k-l) + S(k-2l) \quad (11)$$

($l$ is an integer portion of $\frac{T}{\Delta t}$)

$$\hat{S}(k) = \left\{ \frac{T^2}{m(m+n)\Delta t^2} + \frac{(2m+n) \cdot T}{m(m+n)\Delta t} + 1 \right\} S(k) - \left\{ \frac{T^2}{m \cdot n \cdot \Delta t^2} + \frac{(m+n) \cdot T}{m \cdot n \cdot t} \right\} S(k-m) + \left\{ \frac{T^2}{n(m+n) \cdot \Delta t^2} + \frac{m \cdot T}{n(m+n)\Delta t} \right\} S(k-m-n) \quad (12)$$

$$(m = 1, 2, 3, \ldots, n = 1, 2, 3 \ldots)$$

where Si ($i=1, 2, 3 \ldots k$) is time-sequential data of the measurement values, $\Delta t$ is a data sampling period, and $S(k)$ is a prediction value at a time k in advance of time T.

The prediction unit predicts the future value based on the measurement values heretofore available by utilizing the formulas (10), (11) and (12).

In the above method, the future value is predicted on the assumption that one-order or two-order differentiation of the measurement data is held. Alternatively, it may be possible to predict the future value on the assumption that n-order differentiation ($n \geq 3$) of the measurement data is held.

In order to predict the future value of the measurement data, the time period to the future point may be divided into several time frames and differentations of the measurement data in different orders may be held in the respective time frames, for example, n-order differentiation of the measurement data is held in one time frame and m-order (m=n) differentiation of the measurement data is held in another time frame.

For example, two-order differentiation of the measurement data is held at a current time k for a time frame up to time k+1, and one-order differentiation of the measurement data is held for a time frame advanced from the time k. In this case, a prediction formula for a measurement value at a time advanced by time T is given by $$\hat{S}(k) = \{2 \cdot S(k) - 3 \cdot S(k-1) + S(k-2)\} \cdot \frac{T}{\Delta t} + S \quad (13)$$

where
$\underline{S}(k)$: measurement data
$\hat{S}k$: prediction method
$\Delta t$: sampling period of measurement data It is also possible to calculate a future value of the measurement data based on a sum-product mean value of the values predicted by at least two of the above prediction methods for the future value. The future value $\hat{S}(k)$ of the measurement data is calculated by the following formula.

$$\hat{S}(k) = \frac{\sum_{i=1}^{n} C_i \hat{S}_i(k)}{\sum_{i=1}^{n} C_i} \quad (14)$$

where
$\hat{S}_i(k)$ ($i=1, 2, 3 \ldots n$): predicted values by the respective methods
n: integer no smaller than 2
$C_i$: positive number Since the prediction process amplifies a noise (RF component) included in the measurement data, it is preferable not to conduct the prediction process in an unnecessary time period if immediate response of prediction is not required. Thus, if the immediate response of prediction is not required, the prediction means conducts the prediction process only in a transient state in which the measurement data varies, and in a steady state where the data is steady at a constant value, the prediction means does not conduct the prediction process but outputs the measurement data as it is.

Where the immediate response of the prediction is required or where the amplification of the noise by the prediction process is to be avoided in the transient state in which the measurement data varies, the predicted value is passed through a one-order or two-order low-pass filter represented by the following formulas of transfer function in which S represents the Laplace operator.

$$\frac{\omega_n^2}{S^2 + \delta\omega_n S + \omega_n^2} \quad (15)$$

or $$\frac{1}{1 + ST} \quad (16)$$

The output of the filter is supplied to the prediction means as the future value of the measurement data. The constants $\delta\omega_n$ and T in the formulas (15) and (16) are selected such that a frequency component in the range defined below is eliminated.

$$\frac{1}{20 \cdot \Delta t} \leq f(Hz) \leq \frac{1}{2 \cdot \Delta t} \quad (17)$$

where $\Delta t$(sec) is the sampling period of the measurement data.

The filters of the formulas (15) and (16) are utilized in the form of the following discrete formulas in the electronic control apparatus for the engine;

$$y(k+1) = \left\{ \left( \frac{2}{\Delta t^2} - \omega_n^2 \right) y(k) + \left( \frac{\delta \omega_n}{2 \cdot \Delta t} - \right.\right. \quad (18)$$

$$\left.\left. \frac{1}{\Delta t^2} \right) y(k-1) + \omega_n^2 \cdot u(k) \right\} / \left( \frac{1}{\Delta t^2} + \frac{\delta \omega_n}{2 \cdot \Delta t} \right)$$

$$y(k+1) = \left( 1 - \frac{\Delta t}{T} \right) y(k-1) + \frac{2 \cdot \Delta t}{T} \cdot u(k) \quad (19)$$

where
u(k): input to the filter
y(k): output from the filter
$\Delta t$: sampling period of the data
a center difference is used to derive the formulas (14) and (15).

The operation of the acceleration/deceleration level discrimination means is now explained. The acceleration/deceleration level discrimination means determines an acceleration or deceleration level representing a magnitude of the acceleration or deceleration of the vehicle based on a displacement $\Delta \theta_{th}$ of the throttle opening degree in a predetermined time.

The acceleration or deceleration level may be set in the following manner.

If $-m_1 \leq \Delta\theta_{th} < m_2$, acceleration level 1
If $-m_2 \leq \Delta\theta_{th} < m_3$, acceleration level 2

$\vdots$

If $-m_i \leq \Delta\theta_{th} < m_{i+1}$, acceleration level $i$ $\vdots$

If $-m_2 < \Delta\theta_{th} \leq -m_1$, deceleration level 1
If $-m_3 < \Delta\theta_{th} \leq -m_1$, deceleration level 2

$\vdots$

If $-m_{i+1} < \Delta\theta_{th} \leq -m_1$, deceleration level $i$ $\vdots$ $(0 < m_1 < m_2 < \ldots < m_i < \ldots)$ Where $|\Delta\theta_{th}| < m_1$, it is regarded that it is not in the acceleration/deceleration status (acceleration/deceleration level 0).

The acceleration/deceleration level discrimination means 12 discriminates the acceleration/deceleration level in accordance with the above formulas and sends the result to the correction means 13.

Figure 2:
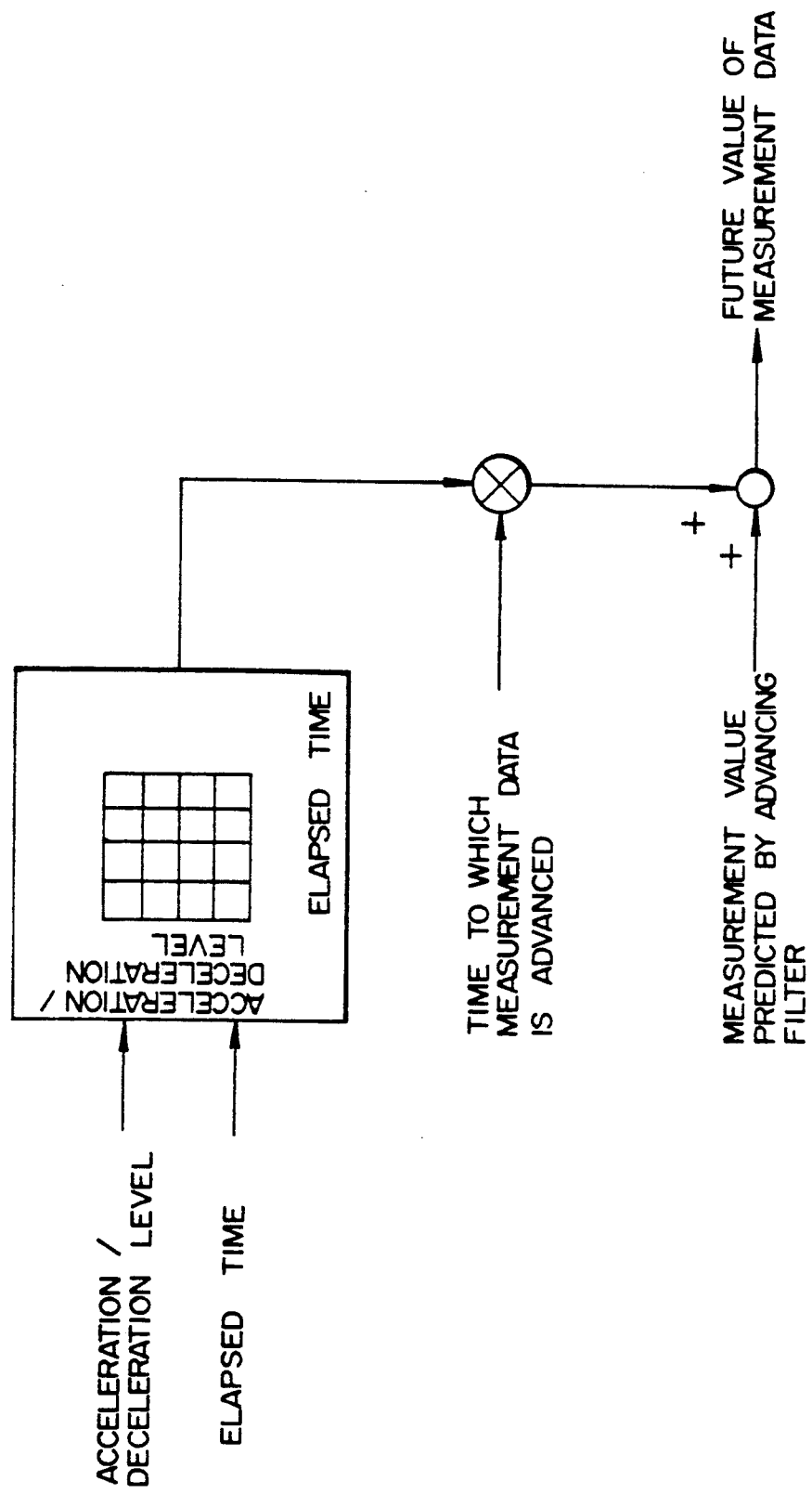
FIG. 2 shows a configuration of correction means shown in FIG. 1.

The operation of the correction means 13 is now explained. FIG. 2 shows a configuration of the correction means 13. The correction means 13 has a two-dimension map having an acceleration/deceleration level and an elapsed time from the start of the acceleration/deceleration on respective axes. The map is looked up based on the determined acceleration/deceleration level and the elapsed time, and a time T to which the measurement data is to be advanced is multiplied by the looked-up value, and a measurement amount which is under or over when the prediction process is conducted is calculated. The output of the prediction unit 11 is added to the calculated measurement amount to produce a real future value of the measurement data a predetermined time ahead.

Figure 3:
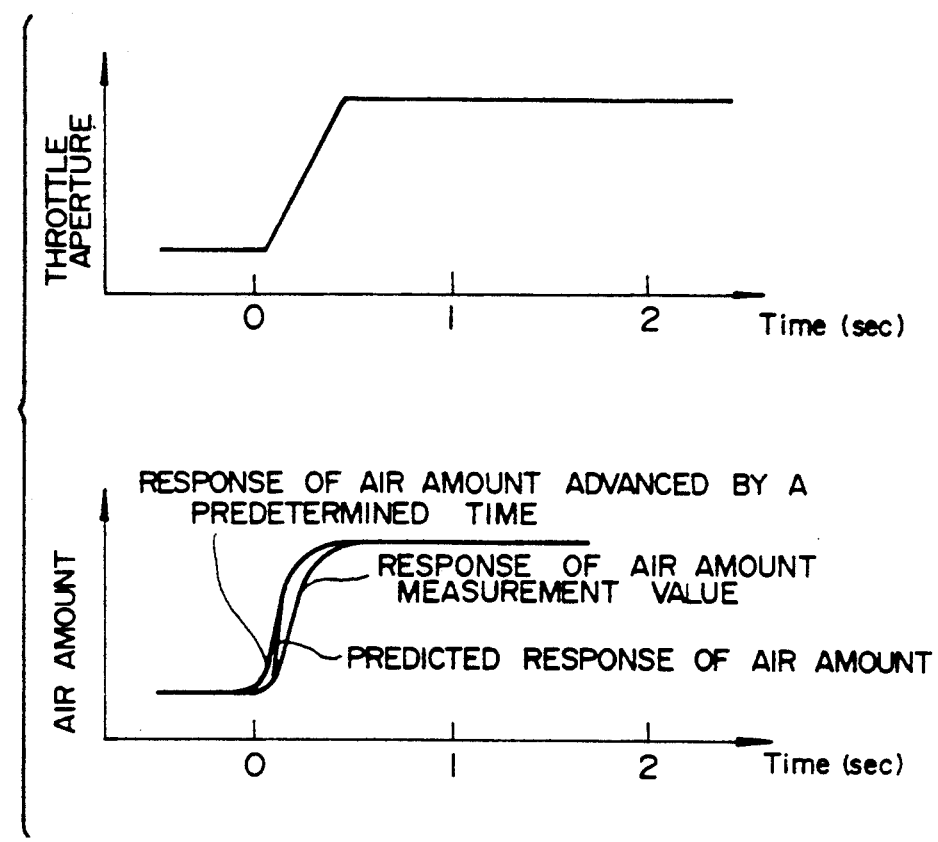
FIG. 3 shows responses of air amount in an acceleration mode, FIG. 4 timings of fuel injection and suction stroke.

FIG. 3 shows a response of suction air amount measurement value when an opening degree of the throttle valve is changed stepwise, a response when the above response is advanced by a desired time $t_0$, and a response when the response of the measurement value is advanced by the time $t_0$ by the prediction process.

As seen from FIG. 3, when the measurement value starts to respond relatively fast from a steady state, the response of the desired time $t_0$ ahead cannot be exactly predicted by the prediction process for a certain time (several or several tens msec.) after the start of response. The correction unit compensates it. Measurement amounts which are under or over when the prediction process is conducted are stored in the map for the respective acceleration/deceleration levels, and the measurement value produced by the prediction process is corrected by looking up the map so that the prediction precision in the early stage of the acceleration/deceleration is assured.

The data of the map of FIG. 2 is calculated in the following manner. The throttle opening degree is changed at the acceleration level i from the steady operation state of the engine in which the throttle opening degree is maintained at a constant level, and an engine status amount which is a subject of current prediction is measured. The response of the measurement value is represented by $S_1(t)$, and a response when the above response is advanced by the time $t_0$ is represented by $S_1(t+t_0)$. A response when the response $S_1(t)$ is advanced by the prediction process is represented by $S_2(t)$. Data $D(t)$ of the acceleration level i of the map is calculated by the following formula:

$$D(t) = \frac{S_1(t + t_0) - S_2(t)}{t_0} \quad (t \geq 0) \quad (20)$$

where t: time

D(t) corresponds to the measurement amount which is under or over when the prediction process is conducted to predict the measurement value of a unit time ahead. Assuming that the under or over-amounts at the respective times are essentially proportional to the time to which the measurement data is to be advanced, the measurement amount which is under or over when the prediction procedure is conducted to predict the measurement value of the time T ahead is represented by T.P(t). Namely, it is a product of the looked-up value of the two-dimension map and the time T. If the output of the prediction unit 11 is added to the product, the future value of the measurement data can be precisely predicted even if the response of the measurement data is relatively fast. In the above method, the measurement amounts which are under or over when the prediction process by the advancing filter is conducted are stored in correlation with the acceleration/deceleration levels. In actual practice, it is affected by the engine rotating speed and the opening degree at the initial stage of the acceleration/deceleration. Accordingly, the rotating speed and the opening degree at the initial stage of the acceleration/deceleration may be introduced as the variables of the map to improve the correction precision.

The method for predicting the future value of the measurement data has thus been explained.

The construction and operation of a control system which applies the method for predicting the future value of the measurement data to the prediction of the suction air amount of the engine to control the fuel will be described.

An engine of speed density type and throttle speed type in which a cylinder inlet air amount is indirectly detected and the fuel is controlled based on the detected amount is considered.

As described above, since the fuel supply amount in the next step is determined based on the detection value of the current air amount in the existing system, there is approximately one stroke of delay in the detection of the air amount and hence it is difficult to precisely control the air-to-fuel ratio.

In order to solve the above problem, the detection value of the air amount to be used for the determination of the fuel supply amount is advanced by a time difference between the time at which the air amount is to be inherently detected, that is, the time at which the exact cylinder inlet air amount of the next step is to be detected and a time at which the air amount to be used for the determination of the fuel supply amount is to be detected.

Figure 4:
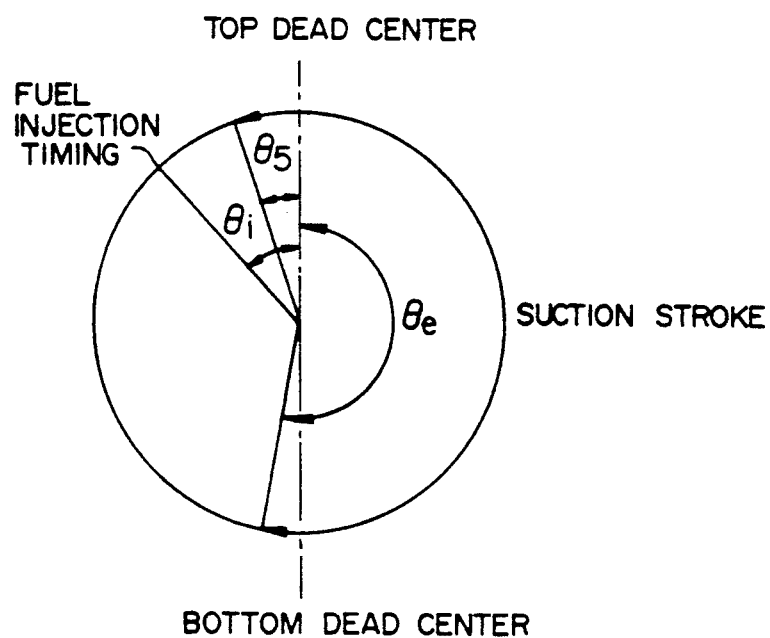

Since the time at which the air amount to be used for the determination of the fuel supply amount is detected is substantially equal to the fuel injection timing, the above time amount may be considered to be essentially within the range of the crank angle defined by the following formula, assuming that $\theta_d$ is a crank angle value corresponding to a time at which an air amount measurement value is to be advanced, and that the fuel injection timing is $\theta_i$ crank angle before a top dead center and a suction stroke is from $\theta_s$ crank angle before the top dead center to $\theta_e$ crank angle after the top dead center, as shown in FIG. 4.

$$\theta_i - \theta_s \leq \theta_d \leq \theta_i + \theta_e \tag{21}$$

The above time difference $T_d$ (sec) is within the following range $$\frac{\theta_i - \theta_s}{6N} \leq T_d \leq \frac{\theta_i + \theta_e}{6N} \tag{22}$$

where N (rpm) is the engine rotating speed. As a value of $T_d$, for example, an average value of the range expressed by formula (22) may be used, that is, the average value $T_d$ is expressed by $$T_d = \frac{2\theta_i - \theta_s + \theta_e}{12N} \tag{22}'$$

This average value is also a value supposing that an accurate amount of air flowing into the cylinder can be detected at a crank angle position at the center of the air suction stroke.

The air amount at the time which is ahead by the time given by the formula (22) is predicted by the above prediction method and the fuel is controlled based on the predicted value. Thus, the delay in the detection of the air amount in the transient state is theoretically compensated and high precision control of the air-to-fuel ratio is attained.

An overall configuration of the control system and an operation of a control program when the fuel control is carried out by a digital control unit are explained with reference to FIGS. 5 and 6.

Figure 5:
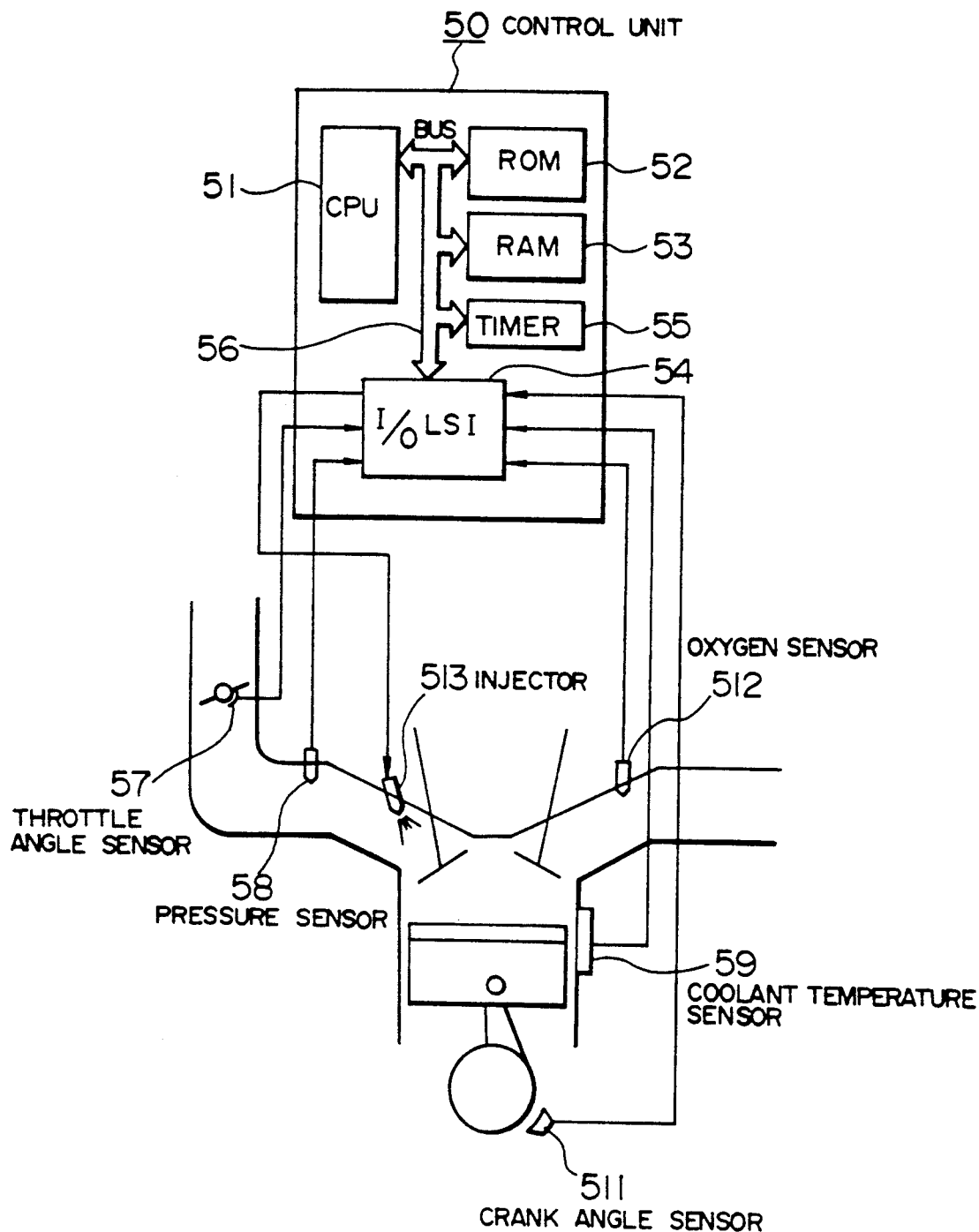
FIG. 5 shows an overall configuration of a fuel injection control apparatus of the present invention.

FIG. 5 shows an overall configuration of a fuel injection control apparatus which uses a speed density system (D jetronic system). A control unit 50 comprises a CPU 51, a ROM 52, a RAM 53, an I/O LSI 54, a timer 55 and a bus which electrically connects those elements. Signals from a throttle angle sensor 57, an internal pressure sensor 58, a coolant temperature sensor 59, a crank angle sensor 511 and an oxygen sensor 512 are supplied to the I/O LSI 54. The I/O LSI 53 sends a signal to a fuel injector 513. The I/O LSI 54 has an A/D converter and a D/A converter. The timer 55 issues an interruption request to the CPU 51 at a constant time interval, and the CPU 51 responds thereto to execute the control program stored in the ROM 52.

Figure 6:
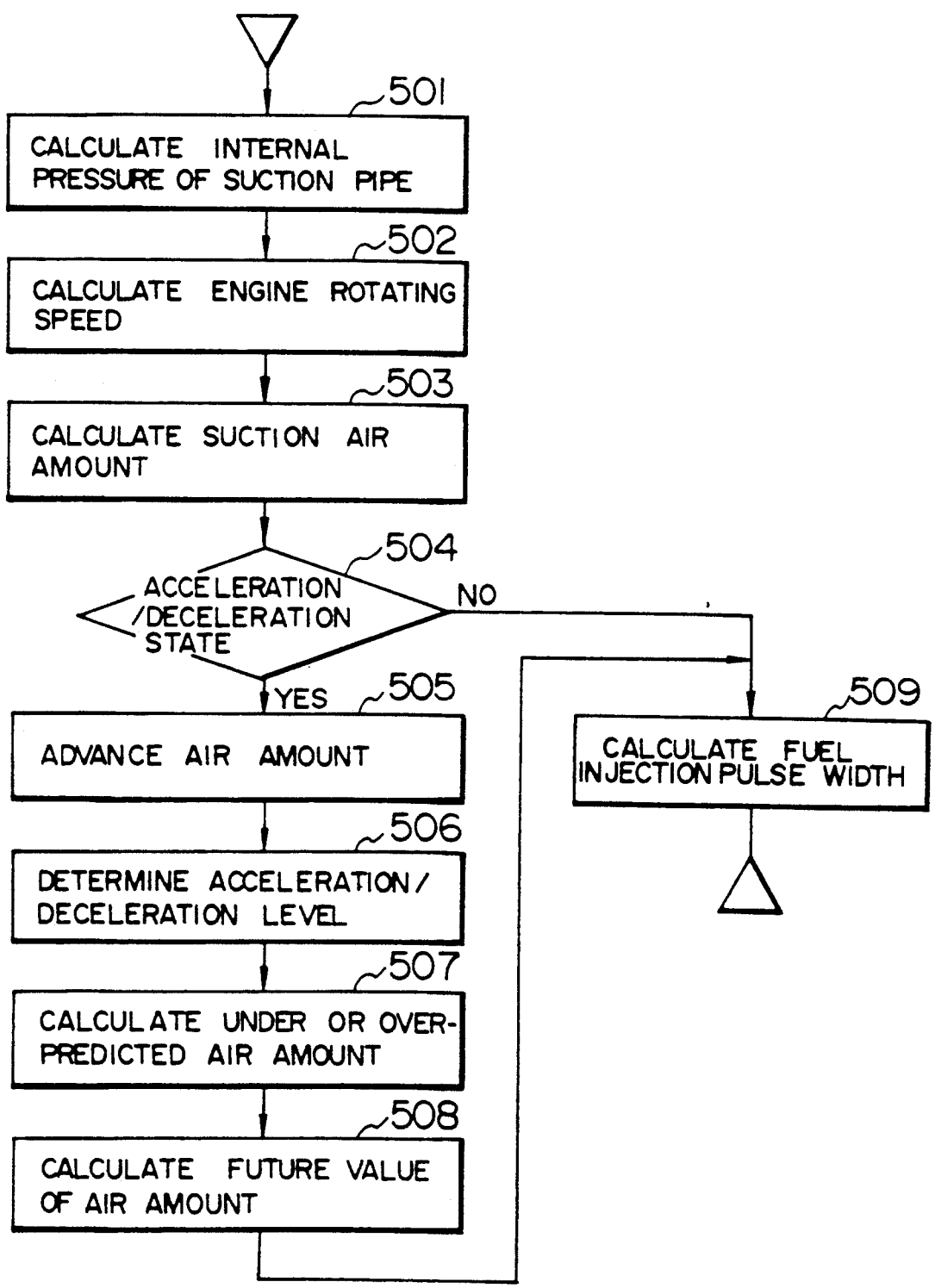
FIG. 6 shows a flow chart of a control program which predict a suction air amount and determines a fuel supply amount based on the predicted amount.

Referring to FIG. 6, the operation of the control program which predicts the future value of the air amount detection value and determines the fuel amount based on the predicted value is explained.

When an interruption request is issued at an interval of 10 msec., the output of the pressure sensor is A/D-converted in a step 501 to determine the internal pressure of the suction pipe. In a step 502, the engine rotating speed is determined based on a signal from the crank angle sensor 511.

In a step 503, the data table stored in the RAM 53 is retrieved by using the engine rotating speed and the internal pressure of the suction pipe as parameters, to determine the engine suction air amount, which is stored into a predetermined address of the RAM 53.

In a step 504, whether the vehicle is in the acceleration/deceleration state is determined by the method described above. If it is in the acceleration/deceleration state, the process proceeds to a step 505, and if not, the process proceeds to a step 509.

In a step 505, the future value of the suction air amount which is ahead of the time of the formula (22) is predicted by the prediction process using the advancing filter, that is, by utilizing the formulas (10), (11), (12), (13) and (14) based on the suction air amount determined in the step 503, and the time-sequential data of the suction air amounts determined in the past interruptions and stored in the RAM 53. In the formulas (10)–(14), $\Delta t$ represents the interruption period (10 msec.).

In a step 506, the acceleration/deceleration level is determined based on the displacement of the throttle opening degree in the manner described above.

In a step 507, the data table stored in the RAM 53 is looked up based on the acceleration/deceleration level and the elapsed time from the start of the acceleration/deceleration, and the looked-up value is multiplied by the time to which the suction air amount is to be advanced as shown in the formula (22) to calculate an air amount $\Delta Qa$ which is under or over when the prediction process by the advancing filter is conducted.

In a step 508, the air amount $\Delta Qa$ which is under or over when the prediction process is conducted is added to the air amount $\hat{Q}a'$ predicted by the advancing filter to calculate a true future value $\hat{Q}_a$ of the suction air amount which is ahead by the time given by the formula (22). The future value $\hat{Q}a$ is calculated by $$\hat{Q}a = \hat{Q}a' + \Delta Qa \tag{23}$$

Finally, in a step 509 following the step 504, a fuel injection pulse width $T_i$ corresponding to the fuel injection amount is calculated by the formula (24) based on the air amount Qa calculated in the step 503. In the step 509 following the step 508, the fuel injection pulse width $T_i$ is calculated by the formula (25) based on the future value $\hat{Q}a$ of the air amount determined by the step 508.

$$T_i = k \cdot \frac{Qa}{N} + T_s \quad (24)$$

$$T_i = k \cdot \frac{\hat{Q}a}{N} + T_s \quad (25)$$

where
k: correction coefficient
N: rotating speed
$T_s$: invalid injection time

After the above steps, the process stands by until next interruption request is issued.

In the above program, the suction air amount is predicted to determine the future value thereof. Alternatively, the time-serial data of the internal pressure of the suction pipe and the rotating speed may be stored, the future values of the internal pressure and the rotating speed may be determined from the time-serial data, and the data table may be looked up by the future values to determine the suction air amount so that the future value of the air amount is determined. The prediction may be done by the prediction unit described above or the prediction method shown in FIG. 1.

The application to the engine of the speed density type has been described. The present invention is also applicable to the prediction of the air amount of a throttle speed type or a mass flow type (L jetronic system) which directly detects an electrical amount. In the throttle speed type which infers the suction air amount based mainly on the throttle opening degree and the rotating speed, the future value is not predicted based on the time-serial data of the inferred values of the air amount, but the future values of the throttle opening degree and the rotating speed are predicted and the suction air amount is inferred based on the predicted values to predict the future value of the air amount. In a MT (manual transmission) car, since the response of the engine rotating speed is much lower than the response of the throttle opening degree, the suction air amount may be inferred based on the future value of the throttle opening degree and the present value of the rotational speed. The prediction may be done by the prediction unit described above or the prediction method shown in FIG. 1.

A method for controlling the fuel solely by synchronous injection based on the predicted air amount has been described. Alternatively, asynchronous injection may be used to control the fuel.

By substituting the formula (14) to the formula (16), the following formula is derived.

$$T_i = k \cdot \frac{\hat{Q}a'}{N} + k \cdot \frac{\Delta Qa}{N} + T_s \quad (26)$$

The above formula means that the pulse width of the synchronous injection is calculated by using the first term of the left side, and the pulse width of the asynchronous injection is calculated by using the second term of the left side.

The pulse width $T_i$ of the synchronous injection may be calculated by the following formula based on the air amount predicted by the advancing filter, and the pulse width $T_i'$ of the asynchronous injection may be calculated by the following formula based on the under prediction $\Delta Qa$ of the air amount calculated for each acceleration/deceleration level.

$$T_i = k \cdot \frac{\hat{Q}a'}{N} + T_s \quad (27)$$

$$T_i' = k \cdot \frac{\Delta Qa}{N} + T_s \quad (28)$$

In the above method, the future value of the air amount for compensating the delay in the detection of the air amount is predicted. The delay in the detection of the air amount may also be compensated by applying the prediction method described above to the fundamental injection pulse width $T_p$ which is calculated by the control unit at the interval of 10 msec.

In this case, the fundamental injection pulse width which is ahead of the time defined by the formula (22) is predicted based on the past data in the prediction method shown in FIG. 1, and the fuel injection pulse width $T_i$ is calculated by the following formula based on the predicted value $\hat{T}_p$.

$$T_i = k \cdot \hat{T}_p + T_s \quad (29)$$

Since the delay in the detection of the air amount is compensated in this manner, the fundamental injection pulse width at the time at which the exact suction air amount in the next stroke is to be detected can be predicted so that high precision control of the air-to-fuel ratio is attained.

Another embodiment of the present invention in which the table is looked up based on engine operation data in an operation unit for the engine control now will be explained.

In the engine control of one type, the fuel injection amount (or the fuel injection pulse width) and the ignition timing are periodically calculated based on engine operation data and a control signal is produced for each predetermined crank angle based on the calculation result.

Also, in the engine control of another type, the fuel injection amount and the ignition timing are calculated and a control signal is produced both for each predetermined crank angle.

The present invention is applicable to such engine control.

An example of table look-up is explained for the engine rotating speed. The present invention is applicable to not only the engine rotating speed table but also to the table for converting the sensor characteristic or the table look-up in the process of operation amount such as fuel injection amount. The table may be either one-dimension or two-dimension because the basic search operation and interpolation operation are the same.

A first embodiment for speeding up the search operation now will be explained.

Figure 15:
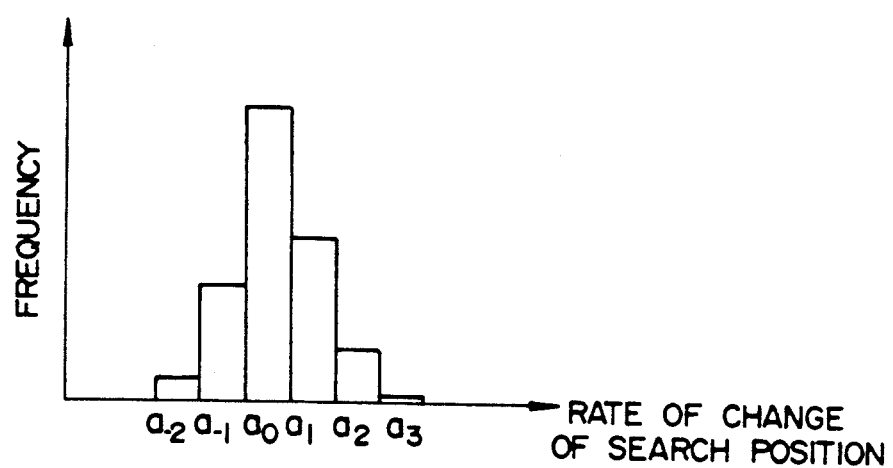
FIG. 15 shows a distribution statistic chart of a rate of change of an engine rotating speed when an automobile runs.

FIG. 15 shows a result of experiment to determine a location on the engine rotating speed table of the engine rotating speed N which is to be used as search data in the table look-up. In FIG. 15, if the position searched at the previous time (which was determined 10 msec before if the operation is done periodically at the interval of 10 msec) is the same as the position currently searched, it is indicated by $a_0$, if the table position is shifted to the ascending side by one, it is indicated by $a_1$, if the table position is shifted by two, it is indicated by $a_2$, if it is shifted to the descending side by one, it is indicated by a-1, if it is shifted by two, it is indicated by a-2, and so on. An ordinate represents the number of times (frequency) in a city drive.

Figure 7:
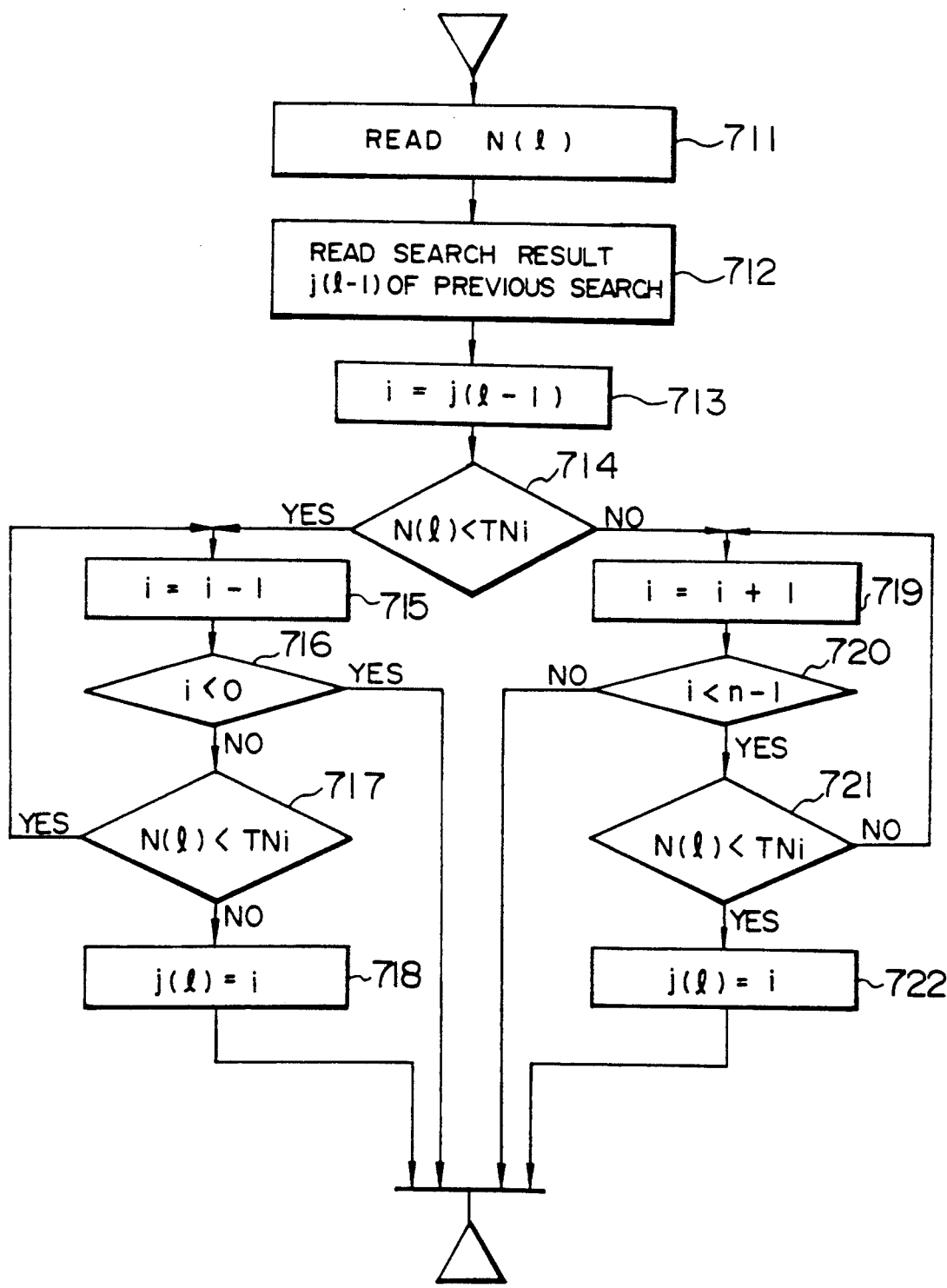
FIG. 7 shows a flow chart of search operation in accordance with one-embodiment of the present invention.
Figure 8:
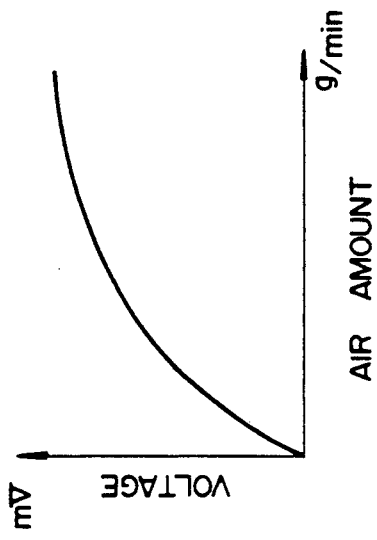
FIG. 8 shows a voltage versus air amount characteristic curve of a hot wire sensor.
Figure 9:
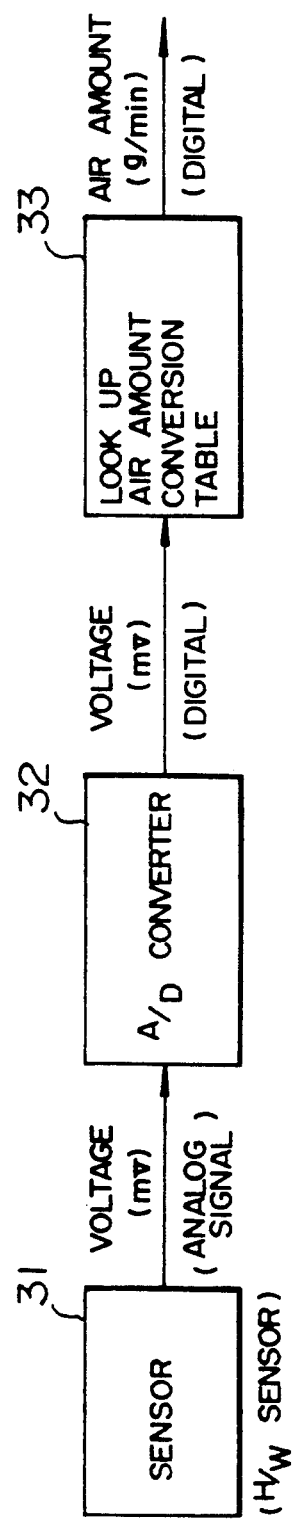
FIG. 9 illustrates a conversion process of a signal produced by the hot wire sensor.
Figure 10:
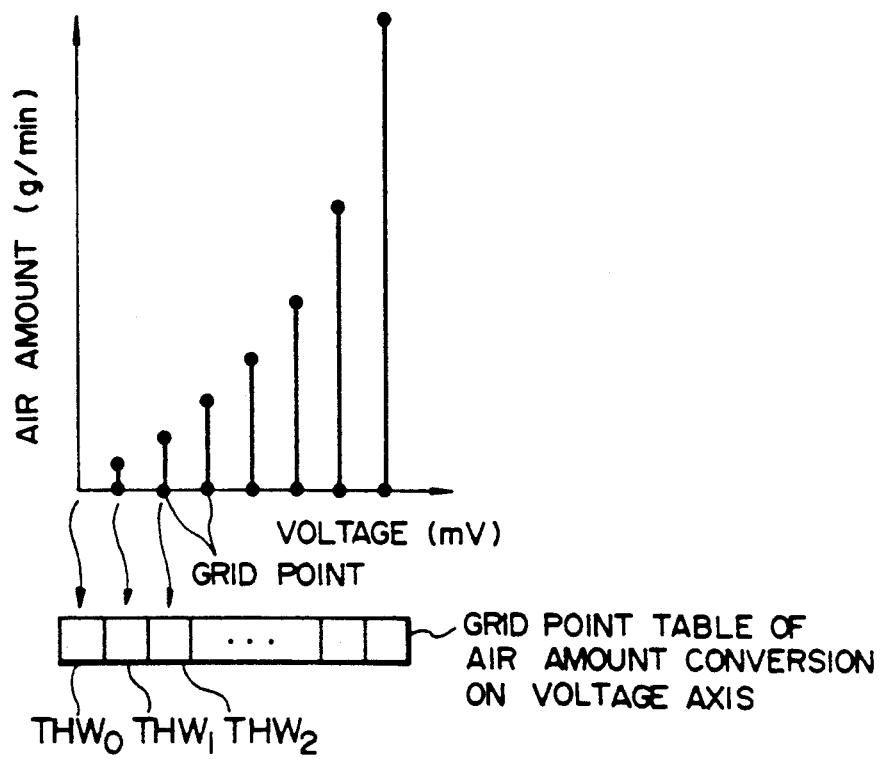
FIG. 10 is a conversion table from data to air amount.
Figure 11:
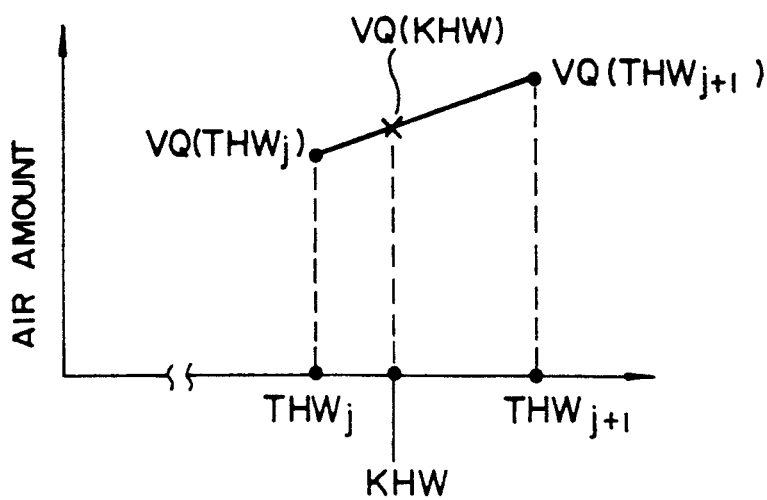
FIG. 11 illustrates linear interpolation.
Figure 12:
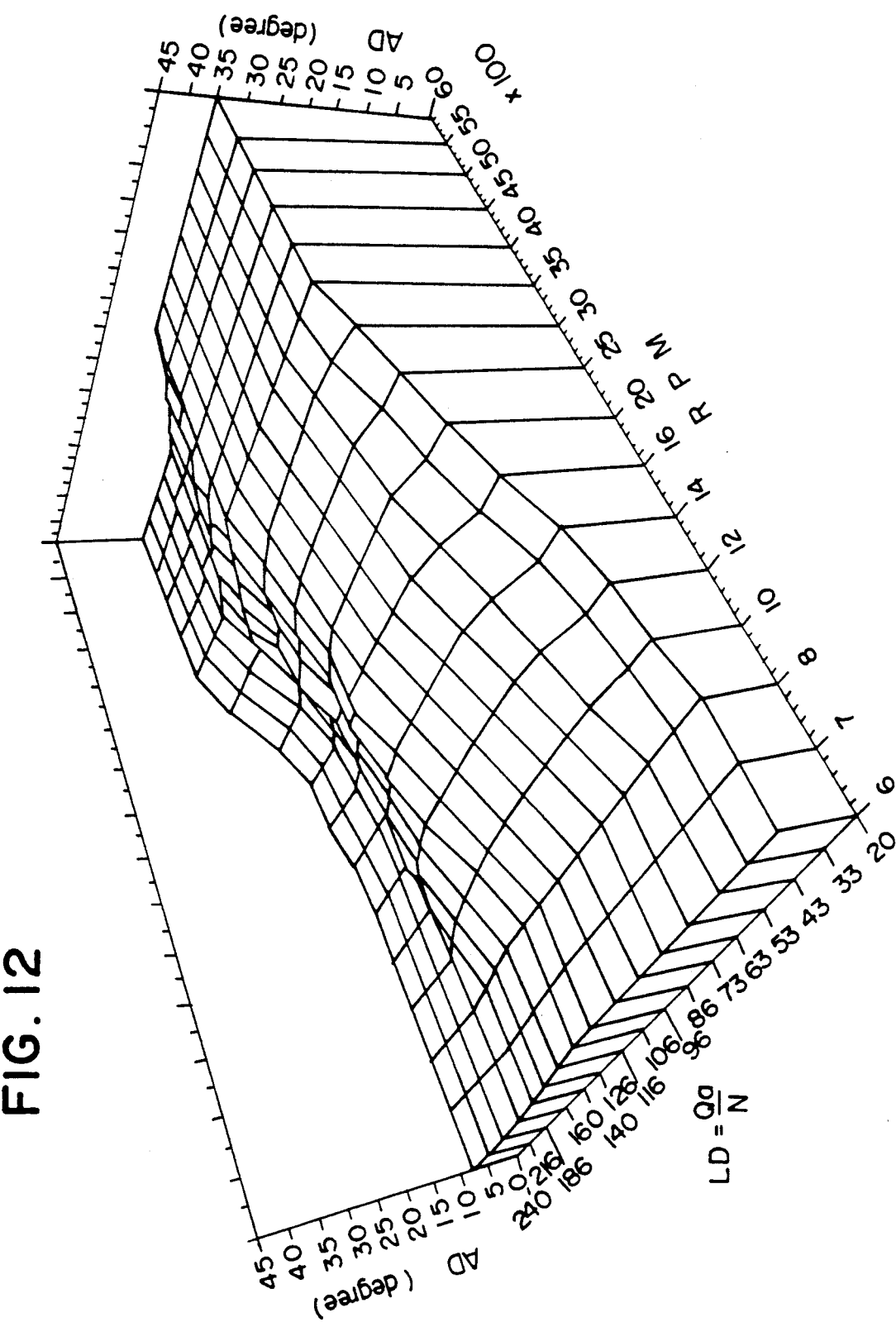
FIG. 12 shows a two-dimension table.
Figure 13:
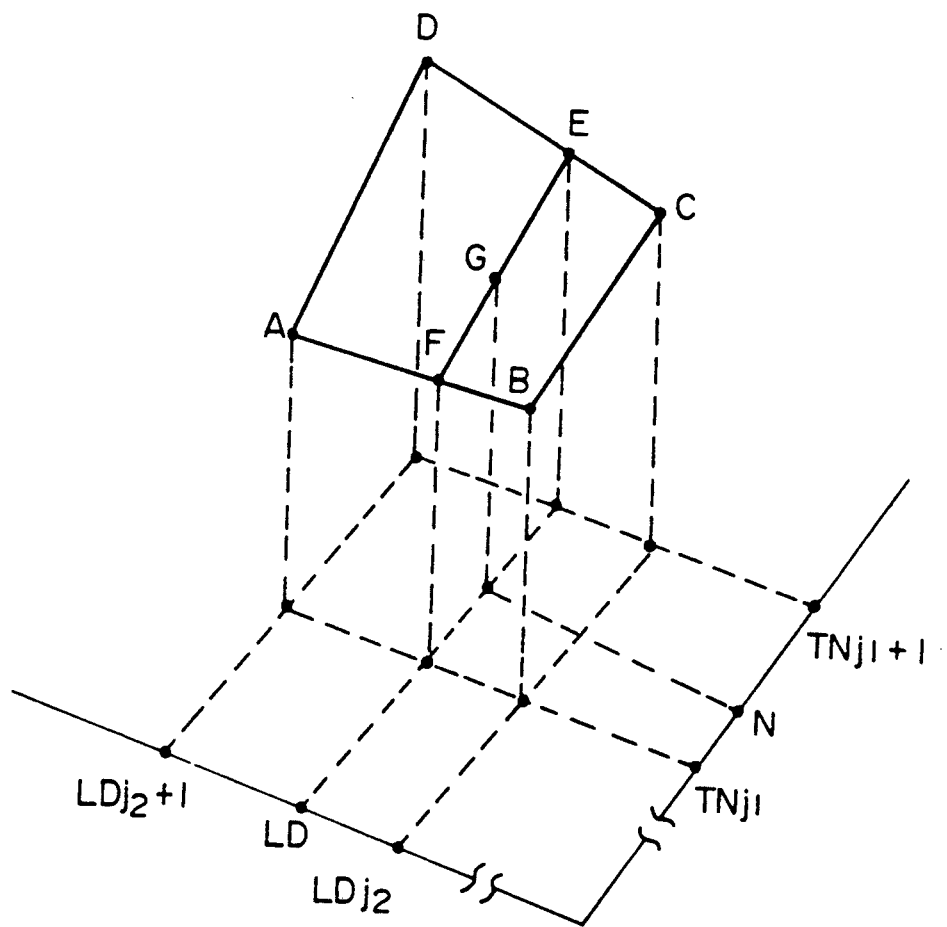
FIG. 13 illustrates two-dimension linear interpolation.
Figure 14:
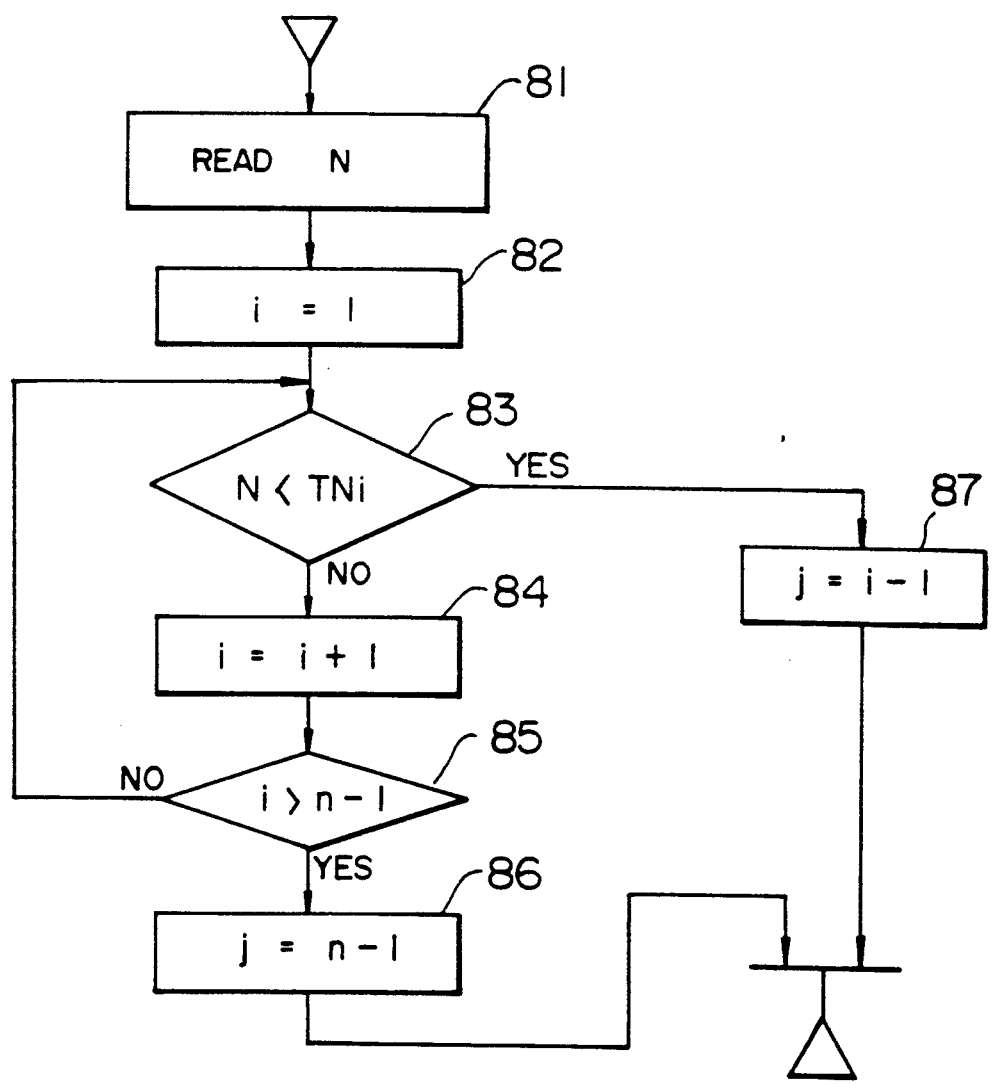
FIG. 14 shows a flow chart of a prior art search operation.

As seen from FIG. 15, the current search positions are distributed around the positions searched at the previous time. It is seen that within a small time period (such as 10 msec), the data (rotating speed N) to be currently searched remains in the vicinity of the position searched previously. Based on the finding derived by the statistics, the following search operation is conducted.

where $$TN_{j \leq N}(l-1) < TN_{j+1} \tag{30}$$

where $j(l-1)$: indicates that the rotating speed $N(l-1)$ was located between j and j+1 on the rotating speed table at the previous time (l−1).
l: current time
l-1: previous time In the search operation, as shown in FIG. 7, the search result $j(l-1)$ at the previous time is held, it is read at the time l, and the search is started from $j(l-1)$. In the steady operation state in which the engine rotating speed does not significantly change, the current search position is the same as or in the vicinity of the previous search position. As a result, the number of times of comparison is reduced and a high speed operation is attained.

Figure 16:
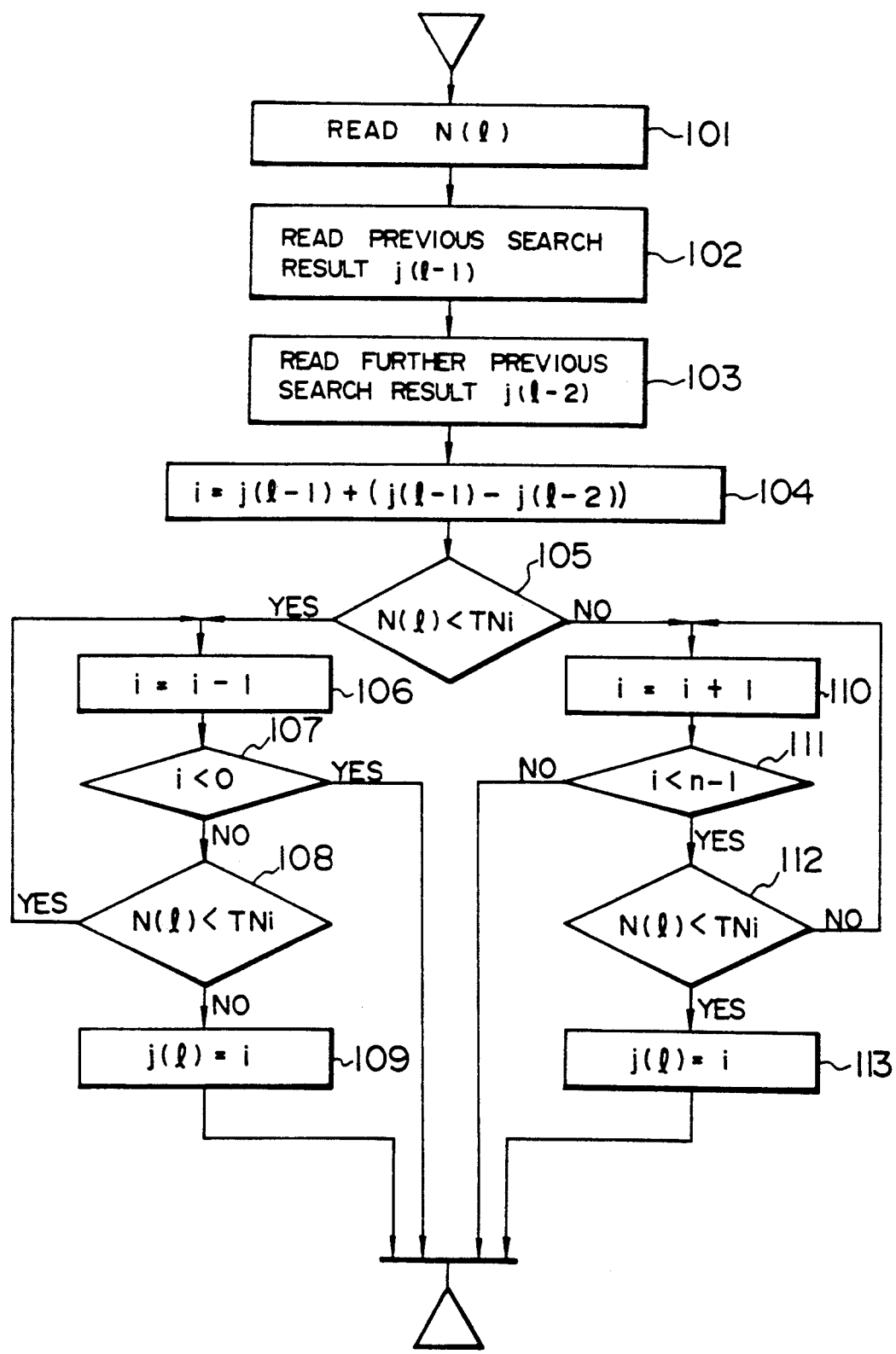
FIG. 16 shows a flow chart of an embodiment in which a current search position is infered based on a past search position for search operation.

A second embodiment is contained in the first means as it is for the first embodiment, and it is a developed form of the first embodiment. As shown in FIG. 16, the current search position is inferred in the following manner based on the search results (search positions) at the part times l-1 and l-2, and the search operation is started from the inferred search position.

$$\hat{j}(l) = j(l-1) + (j(l-1) - j(l-2)) \tag{31}$$

where $\hat{j}l$ is the inferred value of the current search position. The search is started with $i = \hat{j}l$ as shown by 104 in FIG. 16, where i is an index for the search position.

In the present embodiment, the current search position is inferred based on the position data searched between the current time l and the time of two times before. In general, the start of search position at the current time is inferred based on the history of the past search positions, not limited to the search position data of two times before. Even in the transient operation state in which the search position changes every time, the trend of the change of the search position is grasped and the inference is made based thereon. Accordingly, the number of times of comparison in the search is reduced and the high speed operation is attained.

Figure 17:
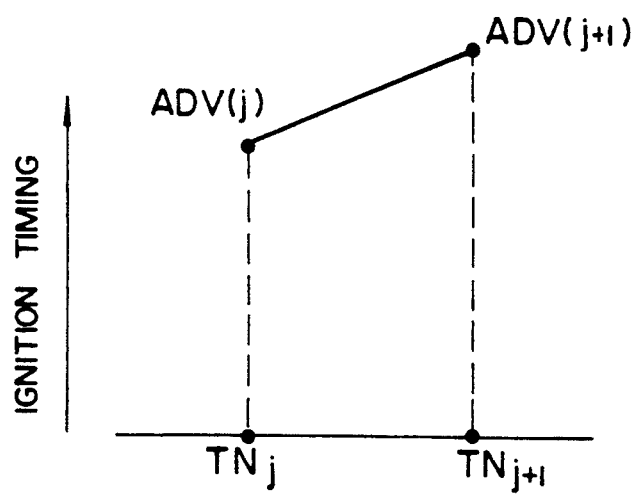
FIG. 17 illustrates a manner to determine a correction value for an ignition timing in the embodiment.

A third embodiment is explained. It corresponds to the second means. As shown in FIG. 15, a probability that the position $j(l)$ searched at the current time is the same as the search position $j(l-1)$ at the previous time is very high from the statistics. In the present embodiment, the gradient at the position $j(l-1)$ calculated at the previous time is held up to the current time l, and if the search positions at the time l−1 and the time l are the same $(j(l) = j(l-1))$, the interpolation operation is carried out by using the held gradient. The present embodiment is shown in FIG. 17. The search position at the time l−1 is represented by $j(l-1)$, and the gradient at the time l−1 is calculated in the following manner.

$$ADSL = \frac{ADV(j+1) - ADV(j)}{TN_{j+1} - TN_j} \tag{32}$$

where ADV is an ignition timing correction value on a one-dimension table for simplification purposes, unlike the two-dimension table shown in the prior art method. The gradient ADSL determined by the formula (32) is held up to the time l, and if the search positions at the time l−1 and the time l (current time) are equal, the interpolation calculation for the ignition timing to the current rotating speed N is conducted in the following manner by using ADSL.

$$ADVC = ADV(j) + ADSL \times (N - TN_j) \tag{33}$$

where ADVC is the correction value for the ignition timing. As seen from the formula (33), it is not necessary at the time l to calculate the gradient for the linear interpolation. Two subtraction operations and one division operation may be omitted and the speed of the interpolation operation is increased.

Figure 18:
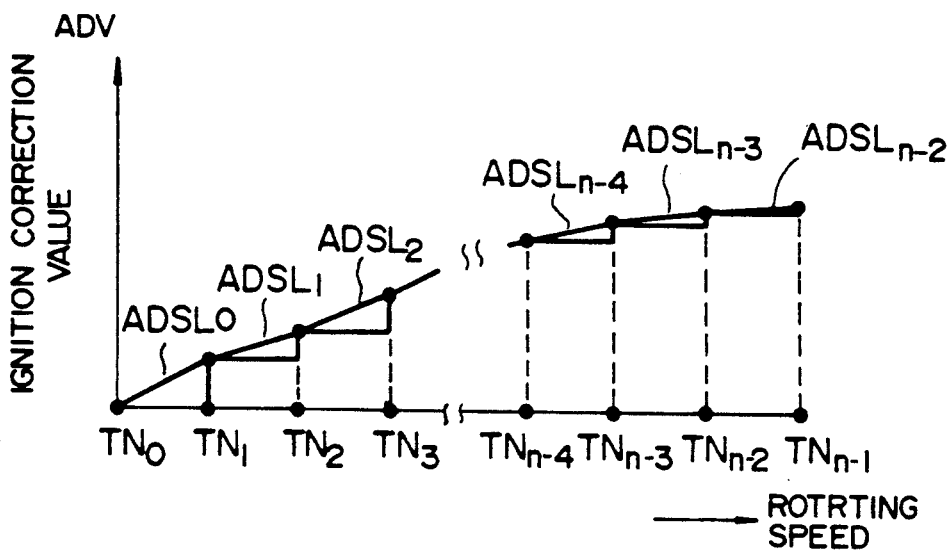
FIG. 18 shows a gradient, at each search position, of the correction value for the ignition timing relative to the rotating speed.
Figure 19A:
FIGS. 19a to 19c illustrate storage locations in FIG. 18, FIGS. 20a and 20b illustrate an ordered table and a table sorted in a descending order.
Figure 19B:
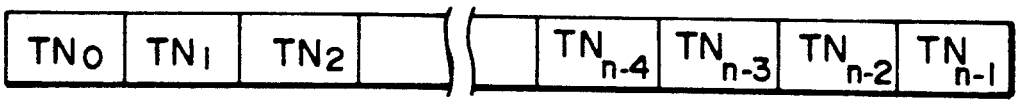
Figure 19C:

A further embodiment is now explained. It corresponds to the third means. As shown in FIG. 18, the gradients of values $ADSL_0, ADSL_1, \ldots, ADSL_{n-1}$ are previously determined and stored at a predetermined storage location. FIGS. 19a to 19c shows the storage location. FIG. 19a shows the storage location for the gradient $\{ADSL_i | 0 \leq i \leq n-1\}$ of the rotating speed between the grid points, FIG. 19b shows the table grid point value $\{TN_i | 0 \leq i \leq n-1\}$ of the rotating speed axis, and FIG. 19c shows the ignition advanced angle correction value $\{ADV_i | 0 \leq i \leq n-1\}$ at the grid point. Since the gradients between the grid points are previously calculated and held, the interpolation operation is performed in the following manner after the search position j has been determined by the search operation.

$$ADVC = ADV(j) + ADSL_j \times (N - TN_j) \tag{34}$$

In the present embodiment, the gradients in the interpolation operation are previously calculated and held, and the gradient at the search position is read and used for the operation. Accordingly, the operation to determine the gradient (two subtraction operations and one division operation) may be omitted.

A fifth embodiment is now explained. It corresponds to the fourth means.

Figure 20A:
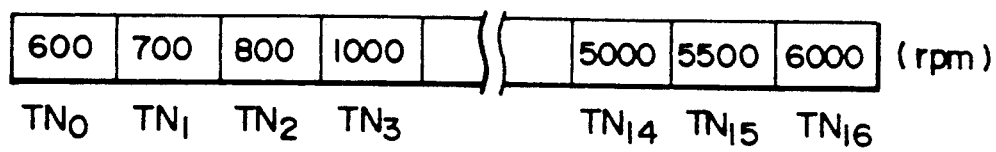

As shown in FIG. 20a, the prior art ordered table is sorted in an ascending order as shown by the formula (9). The ordered table is modified to the descending order in the following manner.

$$\{TNT_k = TN_{n-1-k} | 0 \leq k \leq n-1\} \tag{35}$$

Figure 20B:
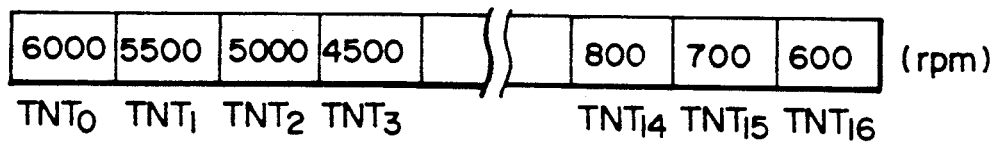
Figure 21:
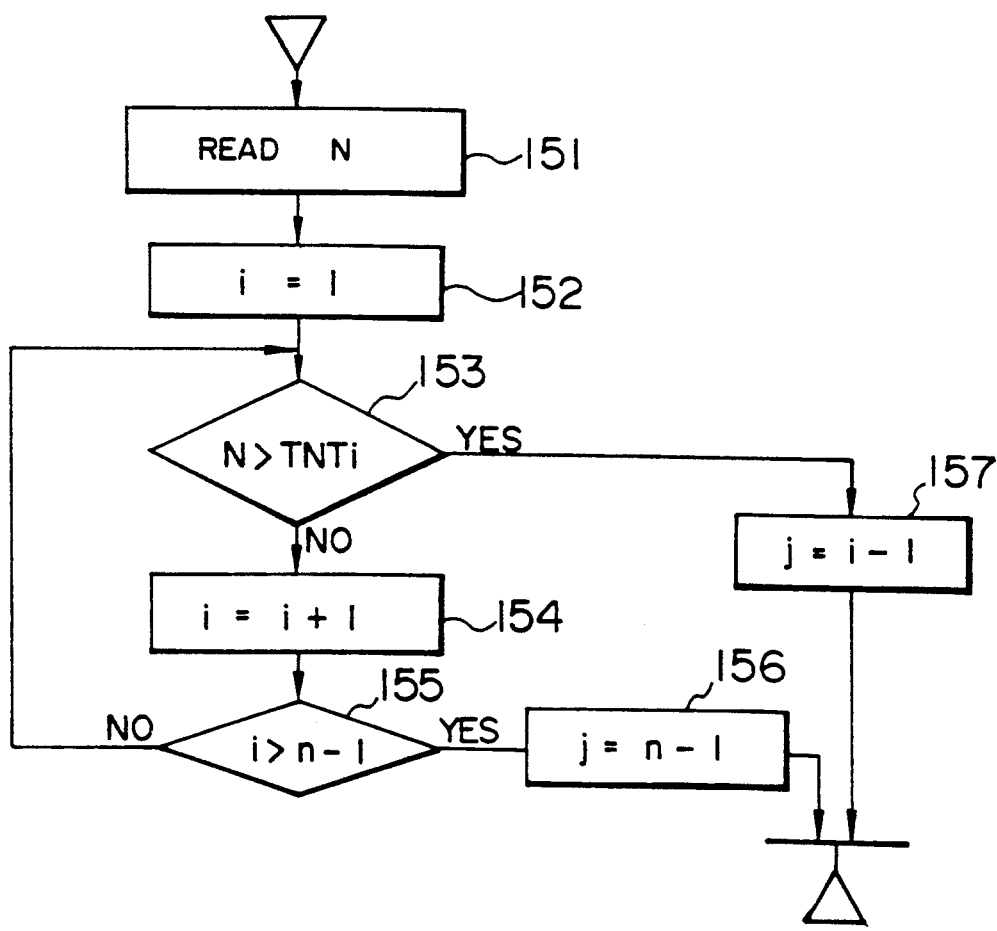
FIG. 21 shows a flow chart of an embodiment in which the search operation is done for the ordered table sorted in the descending order.

The ordered table $\{TNT_i\}$ is sorted in the descending order of the engine rotating speed as shown in FIG. 20b. In the present embodiment, the searching is done in the descending order of the ordered table value sorted in the descending order as shown in FIG. 21.

As explained in the prior art method, the higher the rotating speed is, the more is the operation to be processed in a given time. Accordingly, the present embodiment, in which the search operation is reduced as the speed is increased, is advantageous in flattening the overall calculation load.

A sixth embodiment is now explained. It corresponds to the fifth means. The start position of search for the suction air amount table is determined based on the result of search by the throttle opening degree table.

Figure 22A:
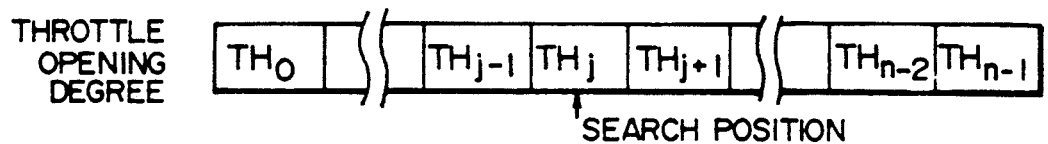
FIGS. 22a and 22b illustrate an embodiment in which a result of search position of a throttle is utilized for a start of search position in the search operation of the air amount.
Figure 22B:
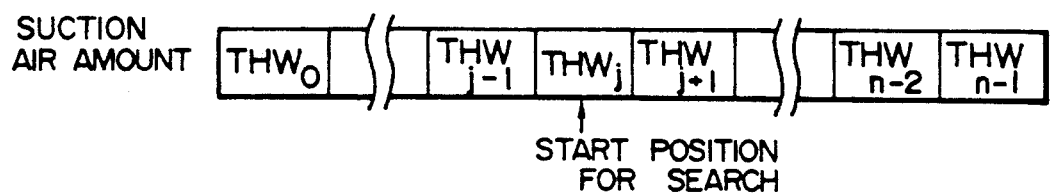

FIG. 22a shows a throttle opening degree table, and FIG. 22b shows a suction air amount table. Each table includes n−1 data (grid points). When a throttle opening degree THR is searched at a position j on the throttle opening degree table $\{TH_i|0\leq i\leq n+1\}$, the position j is used as the start position for searching where on the suction air amount table (grid points $\{THW_i|0\leq i\leq n-1\}$ on the voltage axis) the suction air amount is located.

Figure 23:
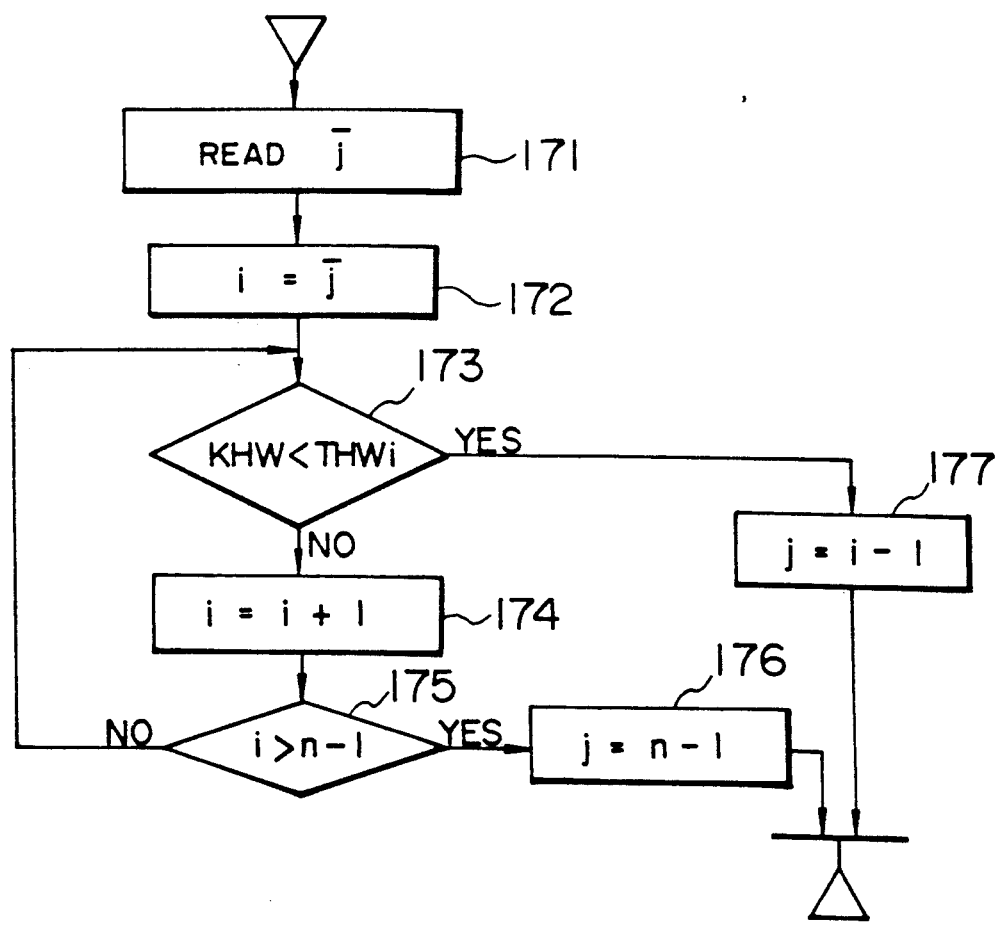
FIG. 23 shows a flow chart for carrying out the embodiment of FIG. 22, FIGS. 24a to 24c illustrate an embodiment in which a start of search position for the air amount is determined based on the search position for the throttle and the search position for the rotating speed.

A flow chart of the search procedure is shown in FIG. 23. In a step 172, the search position j of the throttle opening degree is set as the start position of the suction air amount. Thus, because of the relationship between the operation data of the engine, for example, where the throttle opening degree is large, the suction air amount is usually large (or vice versa), the search position can be inferred to some degree from the search position of other data. Accordingly, the number of times of comparison in the search operation can be reduced.

Figure 24A:
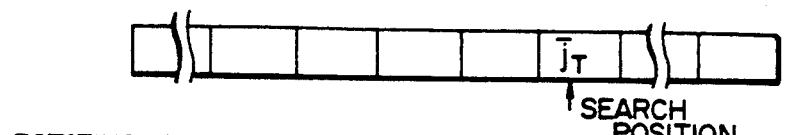
Figure 24B:
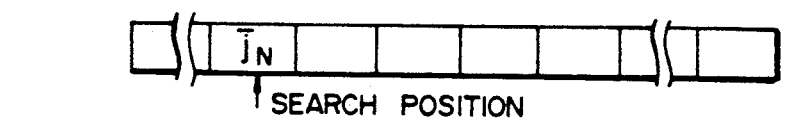
Figure 24C:
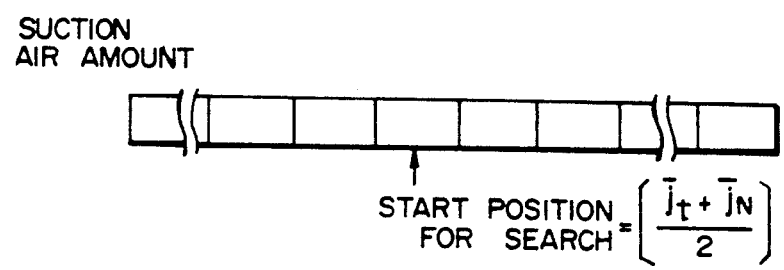

As shown in FIGS. 24a to 24c, the result of search operation of the throttle opening degree by the throttle opening degree table is represented by $\overline{jT}$, and the result of search operation of the rotating speed by the rotating speed table is represented by $\overline{jN}$. Thus, the start position j of search to search the suction air amount from the suction air amount table is determined as follows.

$$\bar{j} = \frac{\overline{jT} + \overline{jN}}{2} \qquad (36)$$

Figure 25:
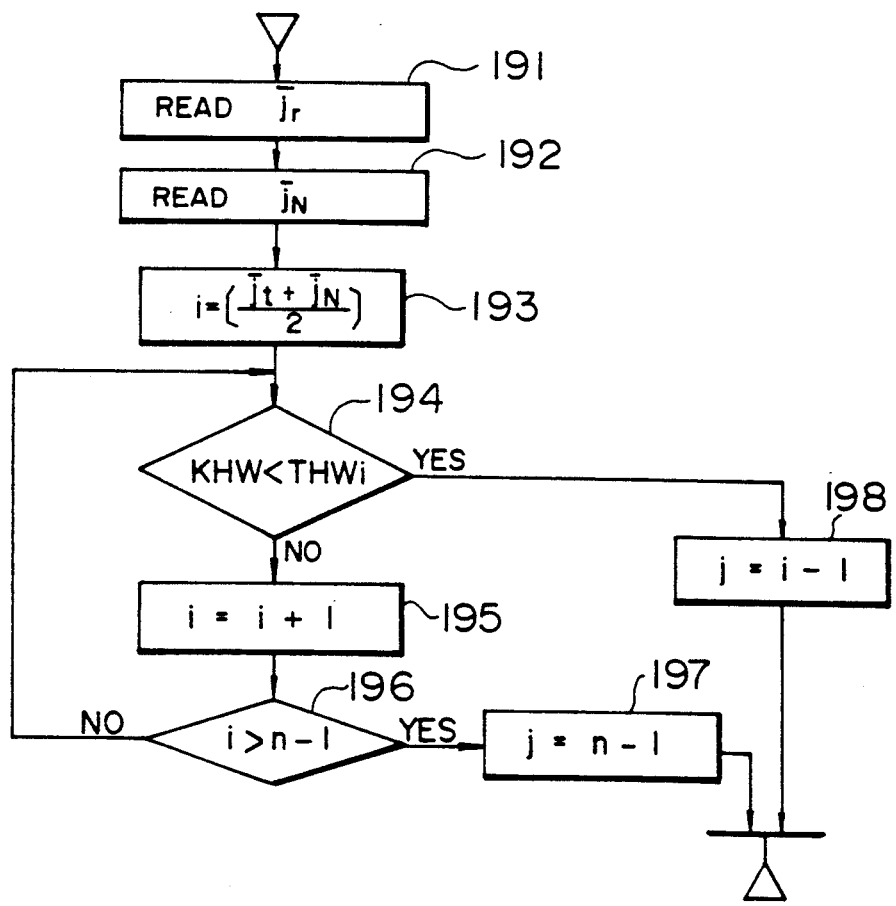
FIG. 25 shows a flow chart for the search operation by using the results of search positions in the embodiment of FIG. 24.

The steps 171 and 172 of FIG. 23 of the previous embodiment are substituted to the steps 191 and 192 of FIG. 25. The search position of highest probability among the combination of the search positions of several data is inferred, and the search operation is started from that search position. As a result, the number of times of comparison in the search operation is reduced and high speed operation is attained.

Figure 26:
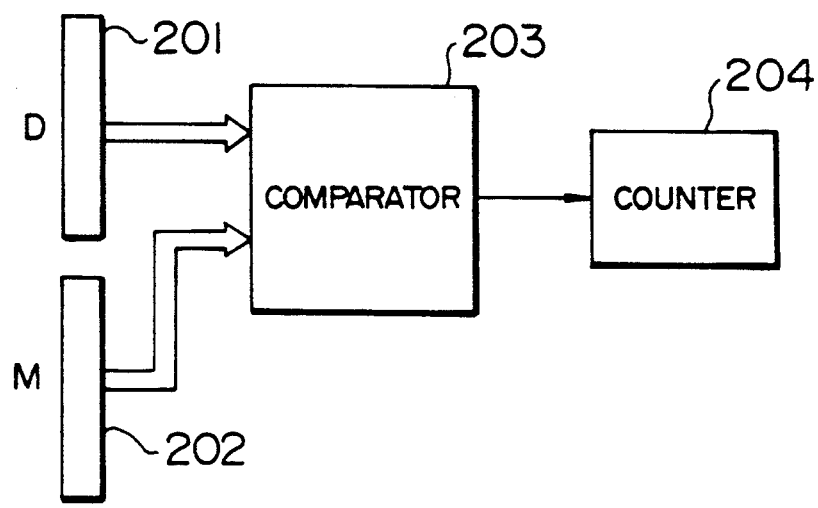
FIG. 26 shows a block diagram of an embodiment in which search operation means is constructed by logic circuits.

A seventh embodiment is now explained. As shown in FIG. 26, a search operation is conducted by a comparator 23 and a counter 204 constructed by logic circuits. The values of the ordered table are sequentially supplied to search data 202 of FIG. 26 and compared with the search data on 201. The counter 204 counts up until the value of the search data becomes smaller than the value of the ordered table. The counter 204 is constructed by flip-flops such that it is counted up only when the signal from the comparator 203 is "ON".

Figure 27:
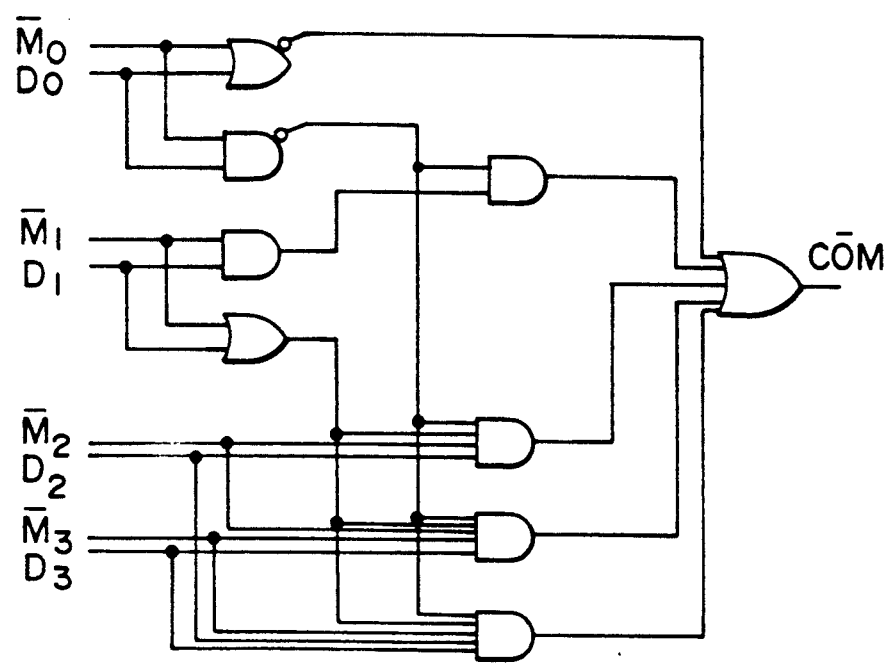
FIG. 27 shows a logic circuit of a comparator of FIG. 26.

FIG. 27 shows an embodiment in which the value of the ordered table is represented by 4 bits and the value of the search data is represented by 4 bits. $D_0$, $D_1$, $D_2$ and $D_3$ represent the input signals of the bits of the 4-bit search data, and $\overline{M_0}$, $\overline{M_1}$, $\overline{M_2}$ and $\overline{M_3}$ represent 4-bit input signal which is a complement of one value of the ordered table. The output COM is "1" when $\overline{M_0}$-$\overline{M_3}$ are larger than $D_1$-$D_3$. A high speed operation is attained by the search operation using the logic circuits.

An eighth embodiment is now explained. It is useful when the intervals between the values of the ordered table are equal.

Figure 28A:
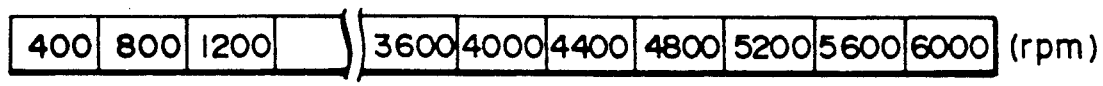
FIG. 28a shows an example in which intervals of values of table are equal.
Figure 28B:
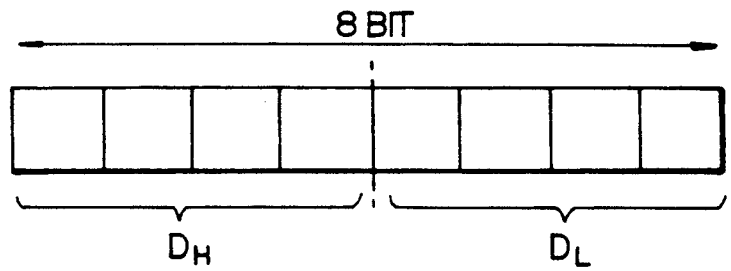
FIG. 28b illustrates division of search data into a higher order portion and a lower order portion.

As shown in FIG. 28a, the intervals between the values of the ordered table are equal and one bit represents 25 rpm unit. Accordingly, the bit pattern $(01)_H$ represents 25 rpm, and $(11)_H$ represents 425 rpm, where H represents HEX (hexadecimal number). Thus, the higher order 4 bits DH of the 8 bits in FIG. 28b represents a position from the top address of the ordered table (that is, the position to be searched), and the lower order 4 bits represent a rate of the value at the search position. Since the linear interpolation operation is relatively easily done in such a case, the interpolation operation is conducted by a microprogram.

Figure 29:
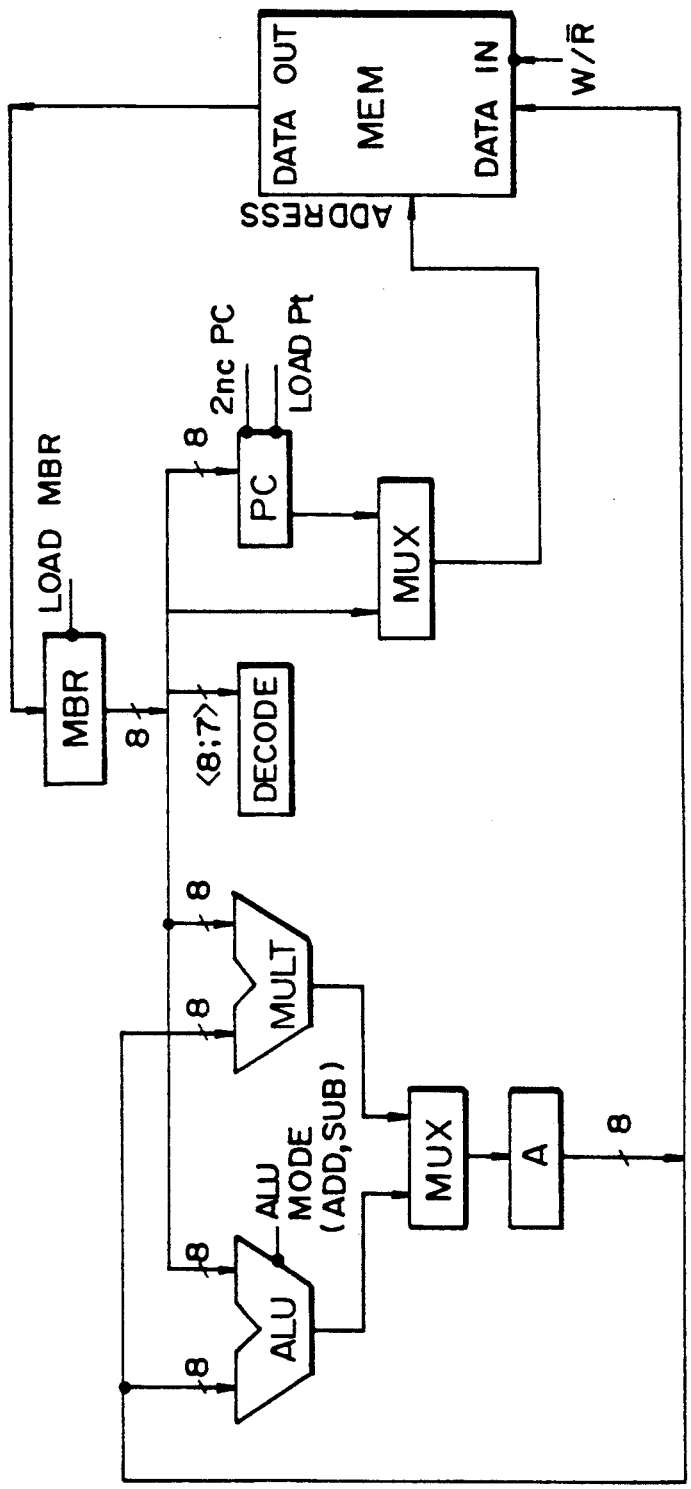
FIG. 29 shows a block diagram of a data path for a microprogram.

FIG. 29 shows a control circuit including a microprogram in accordance with the present embodiment.

The control circuit comprises an adder ALU, a multiplier MULT, a memory buffer register MBR, a program counter PC, a multiplexor MUX, a memory MEM, an accumulator A, a microprogram ROM, a program ROM address register PAR and a multiplexor MUX.

Figure 30:
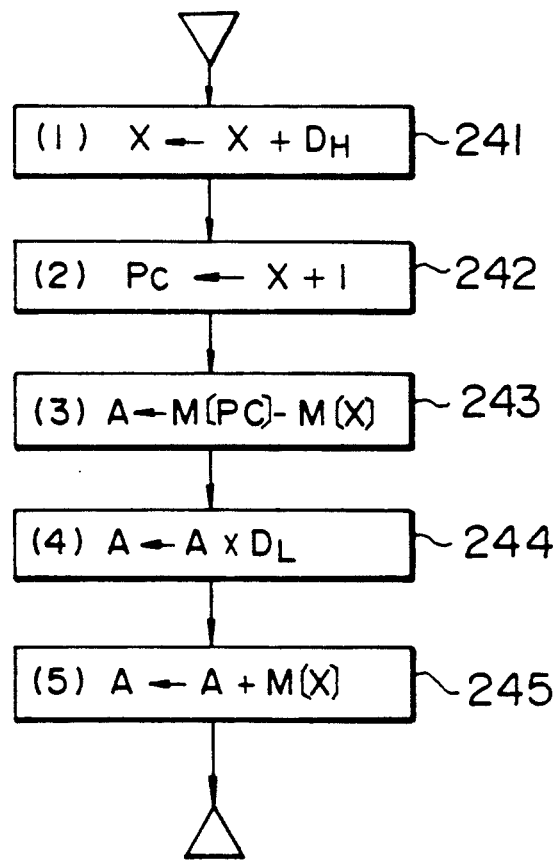
FIG. 30 shows a flow chart of execution of a microprogram instruction.

The microprogram in the present embodiment is shown in FIG. 30 as an instruction execution chart. X represents a top address of the ordered table, $D_H$ represents a high order portion M[] represents a $D_L$ represents a low order portion content of the address []. In FIG. 30, the following procedure is shown. (1) Add the top address of the ordered table to the high order portion of the search data to determine the position in the ordered table. (It corresponds to the search operation). (2) Increment the search position X determined by the above step in order to determine the uppermost address of the searched position. (3) Calculate a difference between the uppermost value and the lowermost value of the search position. In this case, no division operation as shown by the formula (32) is required because a ordered tables are arranged at the constant interval, and the result represents the gradient at the search position. (4) Multiply the gradient by the low order portion of the search data. This corresponds to the operation of the second term in the right side of the formula (33). (5) Add the value at the search position to the interpolation operation result determined in the step (4) to determine the final interpolation value.

In accordance with the present embodiment, a high speed operation is attained because the interpolation is effected by the microprogram.

The following effects are offered by the present invention.

(i) Since the suction air amount one stroke ahead can be precisely determined, the fuel supply amount can always be held at a proper level and the air-to-fuel ratio can be controlled with high precision. As a result, a cleaning function for exhaust gas and a fuel consumption-motive force characteristic are improved.

The detection error of the air amount in the transient state, which has been compensated by the allopathic treatment in the prior art method is compensated by a theoretical method. Accordingly, the number of steps for developing the fuel control system is reduced.

(ii) According to the means (1)–(6) for achieving the third object described in the "SUMMARY OF INVENTION", the following effects are offered.

According to the first means, the search operation time is shortened and a high operation speed is attained because the search data is substantially at the previous search position or in the vicinity thereof in the steady operation state. In the transient operation state, the search operation time is again shortened and the high speed operation is attained because the search operation is conducted by watching the trend of change of data.

(iii) According to the second means, the part operation result is utilized for the current linear interpolation operation. Accordingly, the operation for the gradient in the interpolation operation may be omitted and a high speed interpolation operation is attained.

(iv) According to the third means, the gradient required in the interpolation operation is previously calculated and held, and the gradient at the searched position is read for use in the interpolation operation. Accordingly, it is not necessary to calculate the gradient each time. Thus, the operation time for the gradient calculation is saved and a high speed interpolation operation is attained.

(v) In accordance with the fourth means, the operation load of the computer is lower as the rotating speed is higher because the number of times of comparison in the search operation decreases as the rotating speed increases. In general, in other operations, the operation load of the computer increases as the rotating speed increases. Accordingly, in accordance with the present means, the overall operation load is flattened and the capability of the computer can be effectively utilized.

(vi) According to the fifth and sixth means, the search position of the data can be inferred from the search position of other data. Since the search position is frequently located at the inferred position or in the vicinity thereof, the number of times of comparison in the search operation can be reduced and a high speed search operation is attained.

We claim:

1. A method for predicting a future value of measurement data to be used in controlling fuel injection of an internal combustion engine, comprising the steps of:
   determining a control level of the engine, based on an amount of control applied to the engine in a predetermined time period;
   periodically generating measurement data representing a condition of the engine which varies with changes in said control level;
   predicting a future value of said measurement data using a digital advancing filter based on measurement data heretofore available on the condition that an increment per unit time of the measurement data is held for the predetermined time period;
   calculating, on the basis of the determined control level on the engine corrective amount to correct said future value predicted in said predicting step when said predicting is conducted;
   adding the calculated corrective amount to the future value predicted in the predicting step to determine a true future value of the measurement data; and
   controlling fuel injection of said engine using said true future value of the measurement data.

2. A method for predicting a future value of measurement data to be used in controlling fuel injection of an internal combustion engine, comprising the steps of:
   determining a control level of the engine, based on an amount of control applied to the engine in a predetermined time period;
   periodically generating measurement data representing a condition of the engine to be controlled which varies with changes in said control level,
   predicting a future value of said measurement data using a digital advancing filter based on measurement data heretofore available on the condition that an increment per unit time of the measurement data is held for the predetermined time period;
   calculating, on the basis of the determined control level of the engine, a corrective amount to correct said future value predicted in said predicting step when said predicting is conducted;
   adding the calculated corrective amount to the future value predicted in the predicting step to determine a true future value of the measurement data; and
   controlling fuel injection of said engine using said true future value of the measurement data;
   wherein said predicting step includes calculating the future value based on the measurement data heretofore available on the condition that m-order differentiation ($m = 1, 2, 3, \ldots$) of the measurement data by time is held for the predetermined time period.

3. A method for predicting a future value of measurement data to be used in controlling fuel injection of an internal combustion engine, comprising the steps of:
   determining a control level of the engine, based on an amount of control applied to the engine in a predetermined time period,
   periodically generating measurement data representing a condition of the engine to be controlled which varies with changes in said control level;
   predicting a future value of said measurement data using a digital advancing filter based on measurement data heretofore available on the condition that an increment per unit time of the measurement data is held for the predetermined time period;
   calculating, on the basis of the determined control level of the engine, a corrective amount to correct said future value predicted in said predicting step when said predicting is conducted;
   adding the calculated corrective amount to the future value predicted in the predicting step to determine a true future value of the measurement data; and
   controlling fuel injection of said engine using said true future value of the measurement data;
   wherein said predicting step includes dividing the time to a future point into several time frames and predicting the future value based on the measurement data heretofore available on the condition that several-order differentiation of the measurement data by time is present in each divided time frame.

4. A method for predicting a future value of measurement data to be used in controlling fuel injection of an internal combustion engine, comprising the steps of:
   determining a control level of the engine, based on an amount of control applied to the engine in a predetermined time period;
   periodically generating measurement data representing a condition of the engine to be controlled which varies with changes in said control level;
   predicting a future value of said measurement data using a digital advancing filter based on measurement data heretofore available on the condition that an increment per unit time of the measurement data is held for the predetermined time period;
   calculating, on the basis of the determined control level of the engine, a corrective amount to correct said future value predicted in said predicting step when said predicting is conducted;
   adding the calculated corrective amount to the future value predicted in the predicting step to determine a true future value of the measurement data; and
   controlling fuel injection of said engine using said true future value of the measurement data;
   wherein said predicting step includes determining whether the measurement data has changed or not, performing the prediction process only when the measurement data has changed; and not performing the prediction process, but outputs the measurement data as it is if the measurement data has not changed.

5. A method for predicting a future value of measurement data to be used in controlling fuel injection in an internal combustion, comprising the steps of:
   determining a control level of the engine, based on an amount of control applied to the engine in a predetermined time period;
   periodically generating measurement data representing a condition of the engine to be controlled which varies with changes in said control level;
   predicting a future value of said measurement data using a digital advancing filter based on measurement data heretofore available on the condition that an increment per unit time of the measurement data is held for the predetermined time period;
   calculating, on the basis of the determined control level of the engine, a corrective amount to correct said future value predicted in said predicting step when said predicting is conducted;
   adding the calculated corrective amount to the future value predicted in the predicting step to determine a true future value of the measurement data; and
   controlling fuel injection of said engine using said true future value of the measurement data;
   wherein said calculating step uses a map having at least an acceleration/deceleration level and an elapsed time from the start of the acceleration/deceleration as variables, and multiples a looked-up value of the map to the time to which the measurement data is to be advanced to calculate a measurement amount which is under or over when the prediction process is conducted.

6. A method for controlling fuel injection of an engine on the basis of a predicted value of measurement data, comprising the steps of:
   determining an acceleration/deceleration level of a vehicle based on a change of a throttle opening degree of a throttle valve in a predetermined time period;
   periodically generating measurement data representing a condition of the engine which varies with changes in said acceleration/deceleration level and which is used for controlling the fuel injection of the engine;
   predicting a future value of said measurement data for a predetermined time in the future using a digital advancing filter based on measurement data heretofore available for the control of the fuel injection of the engine;
   calculating a correction amount based on the determined acceleration/deceleration level to correct said future value predicted in said predicting step when the predicting is conducted;
   adding the calculated correction amount to the future value predicted in the predicting step to determine a true future value of the measurement data; and
   controlling the fuel injection in accordance with said true future value of the measurement data.

7. A method for controlling fuel injection of an engine according to claim 6 wherein said measurement data is a detection value of suction air amount of the engine.

8. A method for controlling fuel injection of an engine according to claim 7 wherein a fuel injection timing is $\theta_i$ crank angle before a top dead center, a suction stroke is from $\theta_s$ crank angle before the top dead center to $\theta_e$ crank angle after the top dead center, and said predetermined time period $T_d$(sec) is within $$\frac{\theta_i - \theta_s}{6N} \leq T_d \leq \frac{\theta_i + \theta_e}{6N}$$

where N (rpm) is the engine rotating speed.

9. A method for controlling fuel injection of an engine according to claim 6 wherein said measurement data comprises detection values of an internal pressure of a suction pipe of the engine and a rotating speed of the engine.

10. A method for controlling fuel injection of an engine according to claim 9 wherein a fuel injection timing is $\theta_i$ crank angle before a top dead center, a suction stroke is from $\theta_s$ crank angle before the top dead center to $\theta_e$ crank angle after the top dead center, and said predetermined time period $T_d$(sec) is within $$\frac{\theta_i - \theta_s}{6N} \leq T_d \leq \frac{\theta_i + \theta_e}{6N}$$

where N (rpm) is the engine rotating speed.

11. A method for controlling fuel injection of an engine according to claim 6 wherein said measurement data is a detection value of a throttle aperture of the engine and an engine rotating speed.

12. A method for controlling fuel injection of an engine according to claim 11 wherein a fuel injection timing is $\theta_i$ crank angle before a top dead center, a suction stroke is from $\theta_s$ crank angle before the top dead center to $\theta_e$ crank angle after the top dead center, and said predetermined time period $T_d$(sec) is within $$\frac{\theta_i - \theta_s}{6N} \leq T_d \leq \frac{\theta_i + \theta_e}{6N}$$

where N (rpm) is the engine rotating speed.

13. A method for controlling fuel injection of an engine on the basis of a predicted value of measurement data, comprising the steps of:
   determining an acceleration/deceleration level of a vehicle based on a change of a throttle opening degree of a throttle valve in a predetermined time period;
   periodically generating measurement data representing a condition of the engine which varies with changes in said acceleration/deceleration level and which is used for controlling the fuel injection of the engine;
   predicting a future value of said measurement data for a predetermined time in the future using a digital advancing filter based on measurement data heretofore available for the control of the fuel injection of the engine;
   calculating a correction amount based on the determined acceleration/deceleration level to correct said future value predicted in said predicting step when the predicting is conducted;
   adding the calculated correction amount to the future value predicted in the predicting step to determine a true future value of the measurement data; and
   controlling the fuel injection in accordance with said true future value of the measurement data;
   wherein said measurement data is a fundamental injection pulse width of the engine.

14. A method for controlling fuel injection of an engine according to claim 13 wherein a fuel injection timing is $\theta_i$ crank angle before a top dead center, a suction stroke is from $\theta_s$ crank angle before the top dead center to $\theta_e$ crank angle after the top dead center, and said predetermined time period $T_d$(sec) is within $$\frac{\theta_i - \theta_s}{6N} \leq T_d \leq \frac{\theta_i + \theta_e}{6N}$$

where N (rpm) is the engine rotating speed.

15. A method for controlling fuel injection of an engine on the basis of a predicted value of measurement data, comprising the steps of:
determining an acceleration/deceleration level of a vehicle based on a change of a throttle opening degree of a throttle valve in a predetermined time period;
periodically generating measurement data representing a condition of the engine which varies with changes in said acceleration/deceleration level and which is used for controlling the fuel injection of the engine;
predicting a future value of said measurement data for a predetermined time in the future using a digital advancing filter based on measurement data heretofore available for the control of the fuel injection of the engine;
calculating a correction amount based on the determined acceleration/deceleration level to correct said future value predicted in said predicting step when the predicting is conducted;
adding the calculated correction amount to the future value predicted in the predicting step to determine a true future value of the measurement data; and
controlling the fuel injection in accordance with said true future value of the measurement data;
wherein a fuel injection time is $\theta_i$ crank angle before a top dead center, a suction stroke is from $\theta_s$ crank angle before the top dead center to $\theta_e$ crank angle after the top dead center, and said predetermined time period $T_d$(sec) is within $$\frac{\theta_i - \theta_s}{6N} \leq T_d \leq \frac{\theta_i + \theta_e}{6N}$$

where N (rpm) is the engine rotating speed.

16. A method for controlling fuel injection of an engine according to claim 15, wherein said measurement data is a detection value of suction air amount of the engine.

17. A method for controlling fuel injection of an engine according to claim 15, wherein said measurement data comprises detection values of an internal pressure of a suction pipe of the engine and a rotating speed of the engine.

18. A method for controlling fuel injection of an engine according to claim 15, wherein said measurement data is a detection value of a throttle aperture of the engine and an engine rotating speed.

19. A method of predicting a future value of measurement data to be used in controlling fuel injection of an internal combustion engine, comprising the steps of:
determining a control level of the engine, based on an amount of control applied to the engine in a predetermined time period;
periodically generating measurement data representing a condition of the engine to be controlled which varies with changes in said control level,
predicting a future value of said measurement data using a digital advancing filter based on measurement data heretofore available on the condition that an increment per unit time of the measurement data is held for the predetermined time period;
calculating, on the basis of the determined control level of the engine, a corrective amount to correct said future value predicted in said predicting step when said predicting is conducted;
adding the calculated corrective amount to the future value predicted in the predicting step to determine a true future value of the measurement data; and
controlling an fuel injection of said engine using said true future value of the measurement data;
wherein said predicting step includes calculating the future value of the measurement data based on a weighted mean value of predicted values obtained by using at least two prediction operations including (i) calculating the future time wherein said predicting step includes calculating the future value based on the measurement data heretofore available on the condition that m-order differentiation (m=1, 2, 3, ... ) of the measurement data by the time is held for the predetermined time period and (ii) wherein said predicting step includes dividing the time to a future point into several time frames and predicting the future value based on the measurement data heretofore available on the condition that several-order differentiation of the measurement data by time is present in each divided time frame.

20. Method of controlling fuel injection in an internal combustion engine, having a throttle valve for controlling intake air, comprising the steps of:
(a) detecting an intake air amount Qa;
(b) predicting a future value of intake air amount $\hat{Q}a'$ using a digital advancing filter based on said detected intake air amount;
(c) determining an acceleration/deceleration level of the engine based on a displacement $\Delta\theta th$ of the throttle valve in a predetermined time;
(d) determining a correction amount $\Delta Qa$ on the basis of at least the acceleration/deceleration level determined in step (c);
(e) correcting the future value of the intake air amount $\hat{Q}a'$ by the correction amount $\Delta Qa$ to gain a corrected future value of the intake air amount $\hat{Q}a$; and
(f) controlling the fuel injection based on the corrected future value of the intake air amount $\hat{Q}a$.

21. Method according to claim 20, wherein a correction amount $\Delta Qa$ is determined on the basis of the elapsed time from the start of the acceleration/deceleration of the engine and the time in which the intake air amount is to be advanced in addition to the acceleration/deceleration level.

22. Method according to claim 21, wherein the correction of the predicted intake air amount $\hat{Q}a'$ is performed by reading a data table with unified correction amounts D(t) stored at a predetermined address in memory with the acceleration/deceleration level and the elapsed time from the start of the acceleration/deceleration of the engine as parameters, and the unified correction amounts D(t) are multiplied by an amount corresponding to the time for which the intake air amount is to be advanced to gain the correction amounts ΔQa.

23. Method according to claim 21, wherein in terms of the crank angle $\theta$ (degree), a fuel injection timing is $\theta i$ before a top dead center, a suction stroke reaches from $\theta s$ before the top dead center to $\theta e$ after the top dead center, and said time Td to which intake air is to be advanced is within $$\frac{\theta_i - \theta_s}{6N} \leq T_d \leq \frac{\theta_i + \theta_e}{6N}$$

where N (rpm) is the engine speed.

24. Method according to claim 20, wherein in terms of the crank angle $\theta$ (degree), a fuel injection timing is $\theta i$ before a top dead center, a suction stroke reaches from $\theta s$ before the top dead center to $\theta e$ after the top dead center, and said time Td to which intake air is to be advanced is within $$\frac{\theta_i - \theta_s}{6N} \leq T_d \leq \frac{\theta_i + \theta_e}{6N}$$

where N (rpm) is the engine speed.

25. Method of controlling fuel injection based on intake air amount determined from parameters of manifold pressure and engine speed by a predetermined relationship, comprising the steps of:
(a) predicting a future value of the manifold pressure using a digital advancing filter based on a measured value manifold pressure;
(b) predicting a future value of engine speed using a digital advancing filter based on a measured value of engine speed;
(c) determining an acceleration/deceleration level of an engine based on a displacement $\Delta\theta$ of a throttle valve in a predetermined time;
(d) determining a correction amount of the future value of manifold pressure on the basis of at least the acceleration/deceleration level;
(e) determining a correction amount of future value of engine speed on the basis of at least the acceleration/deceleration level;
(f) correcting the future value of the manifold pressure by the correction amount of the manifold pressure to gain a corrected future value of the manifold pressure;
(g) correcting the future value of the engine speed by the correction amount of the engine speed to gain a corrected future value of the engine speed;
(h) determining the future value of the intake air amount using parameters of said corrected future values of the manifold pressure and engine speed according to said relationship; and
(i) controlling fuel injection based on the future value of the intake air amount.

26. Method according to claim 25, wherein a correction amount of the future value of manifold pressure is determined on the basis of the elapsed time from the start of the acceleration/deceleration of the engine and the time to which the manifold pressure amount is to be advanced in addition to the acceleration/deceleration level, and a correction amount of the future value of engine speed is determined on the basis of the elapsed time from the start of the acceleration/deceleration of the engine and the time for which the engine speed amount is to be advanced in addition to the acceleration/deceleration level.

27. Method according to claim 26, wherein the correction of the predicted manifold pressure is performed by reading a first data table with first unified correction amounts stored at a predetermined address in memory with the acceleration/deceleration level and the elapsed time from the start of the acceleration/deceleration of the engine as parameters, and the first unified correction amounts are multiplied by the time to which the manifold pressure is to be advanced to gain the correction amounts of the future value of the manifold pressure and that the correction of the predicted engine speed is performed by a reading second data table with second unified correction amounts stored at another predetermined address in memory with the acceleration/deceleration of the engine as parameters, and the second unified correction amounts are multiplied by the time for which the engine speed is to be advanced to gain the correction amounts of the future value of the engine speed.

28. Method according to claim 26, wherein in terms of the crank angle $\theta$ (degree), a fuel injection timing is $\theta i$ before a top dead center, a suction stroke reaches from $\theta s$ before the top dead center to $\theta e$ after the top dead center, and said time Td in which manifold pressure and engine speed are to be advanced is within $$\frac{\theta_i - \theta_s}{6N} \leq T_d \leq \frac{\theta_i + \theta_e}{6N}$$

where N (rpm) is the engine speed.

29. Method according to claim 25, wherein in terms of the crank angle $\theta$ (degree), a fuel injection timing is $\theta i$ before a top dead center, a suction stroke reaches from $\theta s$ before the top dead center to $\theta e$ after the top dead center, and said time Td to which manifold pressure and engine speed are to be advanced is within $$\frac{\theta_i - \theta_s}{6N} \leq T_d \leq \frac{\theta_i + \theta_e}{6N}$$

where N (rpm) is the engine speed.

30. Method of controlling the fuel injection based on intake air amount determined with parameters of throttle angle and engine speed using a predetermined relationship, comprising the steps of:
(a) predicting a future value of the throttle angle using a digital advancing filter based on the measured throttle angle;
(b) predicting a future value of the engine speed using a digital advancing filter based on the measured engine speed;
(c) determining an acceleration/deceleration level of an engine based on a displacement $\Delta\theta$ of the throttle angle in a predetermined time;
(d) determining a correction amount of the future value of throttle angle on the basis of at least the acceleration/deceleration level;
(e) determining a correction amount of the future value of engine speed on the basis of at least the acceleration/deceleration level;
(f) correcting the future value of the throttle angle using the correction amount of the throttle angle to gain a corrected future value of the throttle angle;

(g) correcting the future value of the engine speed using the correction amount of the engine speed to gain a corrected future value of the engine speed;

(h) determining the future value of the intake air amount with parameters of said corrected future values of the throttle angle and engine speed in accordance with said relationship; and (i) controlling the fuel injection based on the future value of intake air amount.

31. Method according to claim 30, wherein a correction amount of the future value of the throttle angle is determined on the basis of the elapsed time from the start of the acceleration/deceleration of the engine and the time for which the throttle angle amount is to be advanced in addition to the acceleration/deceleration level, and a correction amount of the future value of the engine speed is determined on the basis of the elapsed time from the start of the acceleration/deceleration of the engine and the time for which the engine speed amount is to be advanced in addition to the acceleration/deceleration level.

32. Method according to claim 31, wherein the correction of the predicted throttle angle is performed by reading a first data table with first unified correction amounts stored at a predetermined address in memory with the acceleration/deceleration level and the elapsed time from the start of the acceleration/deceleration of the engine being used as parameters; and the first unified correction amounts are multiplied by the time for which the throttle angle is to be advanced to gain the correction amounts of the future value of the throttle angle; and the correction of the predicted engine speed is performed by reading a second data table using second unified correction amounts stored at another predetermined address in memory with acceleration/deceleration level and the elapsed time from the start of the acceleration/deceleration of the engine being used as parameters, and the second unified correction amounts are multiplied by the time for which the engine speed is to be advanced to gain the correction amounts of the future value of the engine speed.

33. Method according to claim 31, wherein in terms of the crank angle $\theta$ (degree) a fuel injection timing is $\theta i$ before a top dead center, a suction stroke reaches from $\theta s$ before the top dead center to $\theta e$ after the top dead center, and said time Td to which throttle angle or engine speed are to be advanced is within $$\frac{\theta_i - \theta_s}{6N} \leq T_d \leq \frac{\theta_i + \theta_e}{6N}$$

where N (rpm) is the engine speed.

34. Method according to claim 30, wherein in terms of the crank angle $\theta$ (degree), a fuel injection timing is $\theta i$ before a top dead center, a suction stroke reaches from $\theta s$ before the top dead center to $\theta e$ after the top dead center, and said time Td to which throttle angle and engine speed are to be advanced is within $$\frac{\theta_i - \theta_s}{6N} \leq T_d \leq \frac{\theta_i + \theta_e}{6N}$$

where N (rpm) is the engine speed.

* * * * *